(12) United States Patent
Nakamura et al.

(10) Patent No.: US 8,402,534 B2
(45) Date of Patent: *Mar. 19, 2013

(54) MANAGEMENT SYSTEM, PROGRAM RECORDING MEDIUM, AND PROGRAM DISTRIBUTION APPARATUS

(75) Inventors: Yusaku Nakamura, Yokohama (JP); Takaki Kuroda, Machida (JP); Takayuki Nagai, Machida (JP); Nobuhiro Maki, Yokohama (JP); Daisuke Shinohara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 835 days.

This patent is subject to a terminal disclaimer.

(21) Appl. No.: 12/529,516

(22) PCT Filed: May 26, 2009

(86) PCT No.: PCT/JP2009/002323
§ 371 (c)(1),
(2), (4) Date: Sep. 1, 2009

(87) PCT Pub. No.: WO2010/137066
PCT Pub. Date: Dec. 2, 2010

(65) Prior Publication Data
US 2011/0231901 A1    Sep. 22, 2011

(51) Int. Cl.
*G06F 15/173*    (2006.01)
*G06F 21/00*    (2006.01)
(52) U.S. Cl. ....... 726/21; 726/2; 726/3; 726/4; 709/224; 709/225; 711/163
(58) Field of Classification Search .................. 726/2–6, 726/26–27, 21; 709/205, 224–229; 711/163
See application file for complete search history.

(56) References Cited

U.S. PATENT DOCUMENTS

| 5,185,860 A | 2/1993 | Wu |
| 7,194,538 B1* | 3/2007 | Rabe et al. ................. 709/224 |
| 7,243,189 B2* | 7/2007 | Nagasoe et al. ............. 711/112 |
| 7,367,050 B2* | 4/2008 | Mitsuoka et al. ................ 726/2 |

(Continued)

FOREIGN PATENT DOCUMENTS

| JP | 04-229742 A | 8/1992 |
| JP | 2005-175736 A | 6/2005 |

(Continued)

OTHER PUBLICATIONS

Internet Storage Name Services (iSNS), Request for comments: 4171, by J. Tseng et al, pp. 1-123, Sep. 2005.*

(Continued)

*Primary Examiner* — Philip Chea
*Assistant Examiner* — Shanto M Abedin
(74) *Attorney, Agent, or Firm* — Foley & Lardner LLP

(57) ABSTRACT

The management system of the present invention is capable of efficiently discovering each apparatus coupled to a communication network. The management server 1 judges a type of an apparatus coupled to a communication network 5 on the basis of service utilization information T1, which is acquired from a discovered device or acquired from a device (an iSNS server 4, for example) having a name server function for resolving an address from a public name, and on the basis of discovery management information prepared beforehand (S1, S2). The management server 1 acquires a communication protocol in accordance with the type of the apparatus from protocol selection rules T3, and attempts authentication of the apparatus by using the communication protocol (S3).

14 Claims, 32 Drawing Sheets

U.S. PATENT DOCUMENTS

| | | |
|---|---|---|
| 7,478,152 B2 | 1/2009 | Holt et al. |
| 2003/0154281 A1* | 8/2003 | Mitsuoka et al. ............. 709/225 |
| 2004/0083285 A1* | 4/2004 | Nicolson ....................... 709/224 |
| 2005/0097324 A1* | 5/2005 | Mizuno ......................... 713/169 |
| 2005/0216767 A1* | 9/2005 | Mitsuoka et al. ............. 713/201 |
| 2005/0240609 A1* | 10/2005 | Mizuno et al. ................ 707/101 |
| 2006/0041595 A1* | 2/2006 | Taguchi et al. ............... 707/200 |
| 2006/0168197 A1* | 7/2006 | Motoyama et al. ........... 709/224 |
| 2006/0212719 A1* | 9/2006 | Miyawaki et al. ............ 713/189 |
| 2008/0278755 A1* | 11/2008 | Martin .......................... 358/1.16 |
| 2010/0106822 A1* | 4/2010 | Nagai et al. ................... 709/224 |
| 2010/0235629 A1* | 9/2010 | Tuda ............................. 713/159 |

FOREIGN PATENT DOCUMENTS

| | | |
|---|---|---|
| JP | 2005-318074 A | 11/2005 |
| JP | 2006-059119 A | 3/2006 |
| JP | 2006-259976 A | 9/2006 |
| JP | 2008-507865 A | 3/2008 |

OTHER PUBLICATIONS

Best Practices for Storage Networks, National Security Agency, pp. 1-30, Oct. 2007.*

U.S. Appl. No. 12/198,192, filed Aug. 26, 2008, Nagai.

U.S. Appl. No. 12/379,522, filed Feb. 24, 2009, Nagai

* cited by examiner

FIG. 7

LU MANAGEMENT TABLE (HOST) — 133

| DRIVE NAME (1331) | iSCSI INITIATOR NAME (1332) | COUPLING DESTINATION iSCSI TARGET NAME (1333) | LUN-ID (1334) |
|---|---|---|---|
| E: | com.hitachi.sv1 | cm.hitachi.sto1 | 0 |
| F: | com.hitachi.sv1 | cm.hitachi.sto1 | 1 |
| ... | ... | ... | ... |

FIG. 8

LU MANAGEMENT TABLE (STORAGE) — 232

| VOL-ID (2321) | SIZE (2322) | TARGET ID (2323) | LUN-ID (2324) |
|---|---|---|---|
| VOL1 | 20GB | TG1 | 0 |
| VOL2 | 20GB | TG1 | 1 |
| VOL3 | 20GB | TG2 | 0 |
| VOL4 | 20GB | TG2 | 1 |
| VOL5 | 20GB | TG3 | 0 |
| VOL6 | 20GB | TG3 | 1 |
| ... | ... | ... | ... |

FIG. 9

| | | | 233 |
|---|---|---|---|
| iSCSI TARGET MANAGEMENT TABLE ||||

| 2331 | 2332 | 2333 |
|---|---|---|
| TARGET ID | iSCSI TARGET NAME | NAMES OF iSCSI INITIATORS FOR WHICH COUPLING IS ALLOWED |
| TG1 | com.hitachi.sto1 | com.hitachi.sv1, com.hitachi.sv11 |
| TG2 | com.hitachi.sto2 | com.hitachi.sv2 |
| TG3 | com.hitachi.sto3 | com.hitachi.sv3 |
| ... | ... | ... |

| APPARATUS LOGIN ID MANAGEMENT TABLE | | |
|---|---|---|
| 3311 | 3312 | 3313 |
| APPARATUS TYPE | USER NAME | PASSWORD |
| HOST | user | pwd |
| HOST | test | test |
| STORAGE | Admin | admin |
| iSNS SERVER | user | pass |
| ... | ... | ... |

FIG. 12

DISCOVERED APPARATUS MANAGEMENT TABLE — 333

| IP ADDRESS | APPARATUS TYPE | APPARATUS ID | MONITORING TARGET FLAG | USER NAME | PASSWORD |
|---|---|---|---|---|---|
| 3331 | 3332 | 3333 | 3334 | 3335 | 3336 |
| 192.168.5.5 | HOST | HOST1 | Yes | user | pwd |
| 192.168.5.6 | HOST | HOST4 | No | user | pwd |
| 192.168.5.10 | STORAGE | SYS1 | Yes | Admin | admin |
| 192.168.5.11 | STORAGE | SYS2 | Yes | Admin | admin |
| 192.168.5.20 | iSNS SERVER | iSNS1 | Yes | user | pass |
| ... | ... | ... | ... | ... | ... |

FIG. 13

APPARATUS COUPLING MANAGEMENT TABLE 334

| APPARATUS ID 3341 | VOL-ID 3342 | iSCSI TARGET NAME 3343 | LUN-ID 3344 | NAMES OF ALLOWED iSCSI INITIATORS 3345 | COUPLING DESTINATION HOST ID 3346 | COUPLING DESTINATION DRIVE NAME 3347 |
|---|---|---|---|---|---|---|
| SYS1 | VOL1 | com.hitachi.sto1 | 0 | com.hitachi.sv1 | HOST1 | E: |
| | VOL2 | com.hitachi.sto1 | 1 | com.hitachi.sv1 | HOST1 | F: |
| | VOL3 | com.hitachi.sto2 | 0 | com.hitachi.sv2 | - | - |
| SYS2 | VOL1 | com.hitachi.sto11 | 0 | - | HOST1 | G: |
| | VOL2 | com.hitachi.sto11 | 1 | - | HOST1 | H: |
| | VOL3 | com.hitachi.sto12 | 0 | - | - | - |
| ... | | | | | | |

FIG. 14

DISCOVERY MANAGEMENT TABLE — 335

| IP ADDRESS (3351) | NODE TYPE (3352) | DISCOVERY PROCESSING FLAG (3353) |
|---|---|---|
| 192.168.5.30 | SERVER | COMPLETE |
| 192.168.5.36 | STORAGE | COMPLETE |
| 192.168.5.38 | APPARATUS MODEL A (STORAGE) | COMPLETE |
| ... | ... | ... |
| 192.168.5.34 | SERVER | WAITING |

FIG. 15

| | | 337 |
|---|---|---|
| PROTOCOL SELECTION RULES | | |
| 3371 | 3372 | 3373 |
| NODE TYPE | APPARATUS TYPE | PROTOCOL TYPE |
| SERVER | HOST | WMI, SSH |
| STORAGE | STORAGE | SMI-S, SNMP |
| SWITCH | NETWORK | SNMP |
| APPARATUS MODEL A (STORAGE) | STORAGE | PROTOCOL A1, PROTOCOL A2 |
| APPARATUS MODEL B (STORAGE) | STORAGE | PROTOCOL B1 |
| APPARATUS MODEL C (STORAGE) | STORAGE | PROTOCOL C1, PROTOCOL C2 |
| ... | ... | ... |

FIG. 16

432 iSCSI NAME MANAGEMENT TABLE

| IP ADDRESS (4321) | iSCSI NAME (4322) | iSCSI NAME TYPE (4323) |
|---|---|---|
| 192.168.5.2 | com.hitachi.sv1 | INITIATOR |
| 192.168.5.3 | com.hitachi.sv2 | INITIATOR |
| 192.168.5.4 | com.hitachi.sto1 | TARGET |
| ... | ... | ... | ently discovered, and provide a program-recording medium, and a program distribution apparatus. A further object of the present invention is to provide a management system with which, by acquiring information from a discovered apparatus, another apparatus related to the discovered apparatus may be efficiently discovered, and provide a program recording medium and a program distribution apparatus. Further objects of the present invention will become apparent from the subsequent description of the embodiments.

MANAGEMENT SYSTEM, PROGRAM RECORDING MEDIUM, AND PROGRAM DISTRIBUTION APPARATUS

TECHNICAL FIELD

The present invention relates to a monitoring target apparatus management system capable of detecting apparatus coupled to a network, and monitoring the detected apparatus as monitoring target apparatus, and to a management server and a monitoring target apparatus management method.

BACKGROUND ART

In management software for managing an information processing system comprising two or more related apparatus such as a host computer and a storage apparatus, a technique, whereby composition information for each apparatus is read in advance and held in an internal storage device, and a second apparatus related to an optional first apparatus is detected based on the read information, has been disclosed (see, for example, Patent Citation 1).

[Patent Citation 1] Japanese Laid-Open Patent Publication 2005-175736

DISCLOSURE OF INVENTION

Technical Problem

A management program that accesses monitoring target apparatus, using protocols of the apparatus, in order to acquire and manage information on the apparatus, may use the following method to detect the apparatus. First, an apparatus search range is designated, and then information used by the respective apparatus protocols (authentication information, port numbers, and the like) is designated if required. Apparatus in the designated range are then sequentially accessed using the various protocols, and information on the monitoring target devices is acquired by acquiring information via those protocols that generate a response.

Normally, when an inquiry is sent to an apparatus by using a communication protocol that is incompatible with the apparatus, a response regarding the incompatibility of the communication protocol is immediately sent back.

However, since there is no response also when an inquiry is sent to an address to which an apparatus has not been assigned, it is necessary to wait until the inquiry times out. Meanwhile, apparatus configured with a high security level may respond to inquiries made using a compatible communication protocol, but not to inquiries using an incompatible communication protocol. Hence, when there is no response to an inquiry, it must be confirmed that timeout has occurred for all the communication protocols.

An apparatus search range usually contains a mix of addresses that generate an immediate response to an inquiry, and addresses for which the inquiry times out. Thus, with a method whereby a plurality of communication protocols are sequentially tested for each IP address within a discovery target range, the timeout waiting times build up, depending on the number of addresses generating an inquiry timeout, and hence the processing time is long.

Furthermore, when an apparatus to be monitored lies outside the address range designated by the administrator, this apparatus is excluded from the monitoring targets, and hence composition information cannot be acquired.

An object of the present invention is therefore to provide a management system with which a plurality of apparatuses coupled to a communication network can be effici

Technical Solution

According to the present invention, in a case where first and second related devices exist, and information on the related second device can be acquired from the first device, a type of the second device is determined according to the type of relationship between the first and second devices, and the role of the second device in the relationship; an access method (protocol) to be used to access the second device is then determined according to the type of the second device, and information acquisition is attempted using this access method (authentication may also be required depending on the protocol). Furthermore, when information on the second device is to be acquired from the first device as mentioned above, in cases where a third device with a name server function for resolving an address from a public name exists, a relationship, managed by a name service of the third device, between the public name and the address of a device is acquired, and information on the second device is acquired by accessing this address. Here, the type of the second device is determined from the name service type and meaning of a name service entry, the access method (protocol) used to access the second device is determined according to the type of the second device, and information acquisition is attempted using the access method (authentication may also be necessary depending on the protocol).

In order to solve the aforementioned problem, the management system of the present invention is a management system for managing a plurality of apparatuses coupled to a communication network, comprising: a memory area; a microprocessor for executing predetermined processing using the memory area; and a communication interface with which the microprocessor communicates with each of the apparatuses via the communication network, the microprocessor communicating with each apparatus via a communication network, and acquiring access information that is used to access a second apparatus, related to a first apparatus, on the basis of network service utilization information associated with the first apparatus. The microprocessor judges a device type of the second apparatus from the role of the second apparatus in a network service on the basis of predefined services, role, and device-type judgment information, selects an access protocol group for access to the second apparatus on the basis of predefined device types and access-protocol compatibility definition information, and then accesses the second apparatus to acquire composition information of the second apparatus.

Access information for the second apparatus related to the first apparatus may sometimes be acquired directly from the first apparatus, and sometimes acquired via a name service or the like.

The plurality of apparatuses coupled to the communication network includes at least: a plurality of apparatuses with a storage area; and a plurality of apparatuses that use the storage area; the memory area of the management system stores at least monitoring target address management information for pre-storing the address range for searching for the monitoring target apparatus; device coupling management information created by associating a referencing/referenced relationship of public names of apparatus, with apparatus names corresponding to the public names; and communication protocol selection information that stores type judgment information for judging the type of the monitoring target apparatus, and communication protocols corresponding to the judged apparatus type; (1) in a case where the communication network includes a name management apparatus that manages, for the respective apparatuses, a public name and an address of the apparatus, and a type that represents a referenced apparatus or a referencing apparatus, the microprocessor: (1a) detects a predetermined storage area with which the apparatus name is not associated, by using the device coupling management information; (1b) in cases where a reference source of public name referencing has been configured in the predetermined storage area, acquires an address corresponding to the reference source from the name management information; (1c) in cases where the address corresponding to the reference source is registered in the monitoring target address management information, judges the apparatus to be a reference source apparatus associated with the predetermined storage area, and registers this apparatus in the type judgment information; (1d) acquires a communication protocol prepared beforehand for the apparatus from the communication protocol selection information, and uses the communication protocol to execute information acquisition of the predetermined apparatus; (1e) in cases where the reference source has not been configured in the predetermined storage area, issues a request to all addresses defined in the name management information to send apparatus composition information indicating a composition of the reference source apparatus; (1f) judges an apparatus that sends apparatus composition information in response to the request to be a destination apparatus, and registers the apparatus in the type judgment information; and (1g) uses the reference source apparatus communication protocol to execute information acquisition from the apparatus that sent the apparatus composition information; (2) in cases where the name management apparatus is not included in the communication network, the microprocessor: (2a) issues a request to all addresses included in the discovery target address management information to send composition information of the reference source apparatus; (2b) judges an apparatus that sends the apparatus composition information in response to the request to be the reference source apparatus, and registers the apparatus in the type judgment information; and (2c) uses the reference source apparatus communication protocol to execute information acquisition from the apparatus that sent the apparatus composition information; the microprocessor: (3) acquires, by authenticating a registered apparatus registered in the type judgment information, configuration information relating to another apparatus which uses the registered apparatus, from the registered apparatus; judges the type of the other apparatus on the basis of the configuration information, and registers the type in the type judgment information; and acquires a communication protocol prepared beforehand according to the type of the other apparatus from the communication protocol selection information, and uses the communication protocol to acquire information of the other apparatus; (4) in cases where, when executing each information acquisition, information acquisition fails using the communication protocol acquired from the communication protocol selection information, the microprocessor: re-attempts the information acquisition by using another communication protocol prepared beforehand for another apparatus type that belongs to the same group as the communication protocol.

In cases where information acquisition of the monitoring target apparatus fails, the microprocessor re-attempts information acquisition of the discovery target apparatus on the basis of another type that is pre-associated with the judged type.

After performing information acquisition on the monitoring target apparatus, the microprocessor acquires configuration information relating to another apparatus that uses the monitoring target apparatus from the monitoring target apparatus, and performs information acquisition the other apparatus on the basis of the type of the other apparatus.

The microprocessor is capable of executing a first discovery mode and a second discovery mode, the first discovery mode being configured such that information acquisition from the monitoring target apparatus is performed on the basis of the judged type, and the second discovery mode performing information acquisition on the monitoring target apparatus by sequentially testing a plurality of communication protocols prepared beforehand.

The present invention is not limited to a management system and may also be implemented as a program recording medium, a program distribution apparatus, or a method for managing apparatus on a communication network.

BRIEF DESCRIPTION OF DRAWINGS

FIG. 7 is a schematic diagram of a volume management table in the host.

FIG. 8 is a schematic diagram of a volume management table in the storage apparatus.

FIG. 9 is a schematic diagram of an iSCSI target management table in the storage apparatus.

FIG. 10 is a schematic diagram of an apparatus login ID management table in the management server.

FIG. 12 is a schematic diagram of a discovered apparatus management table in the management server.

FIG. 13 is a schematic diagram of a device coupling management table in the management server.

FIG. 14 is a schematic diagram of a discovery management table in the management server.

FIG. 15 is a schematic diagram of protocol selection rules in the management server.

FIG. 16 is a schematic diagram of an iSCSI name management table in the iSNS server.

EXPLANATION OF REFERENCE

Figure 1:
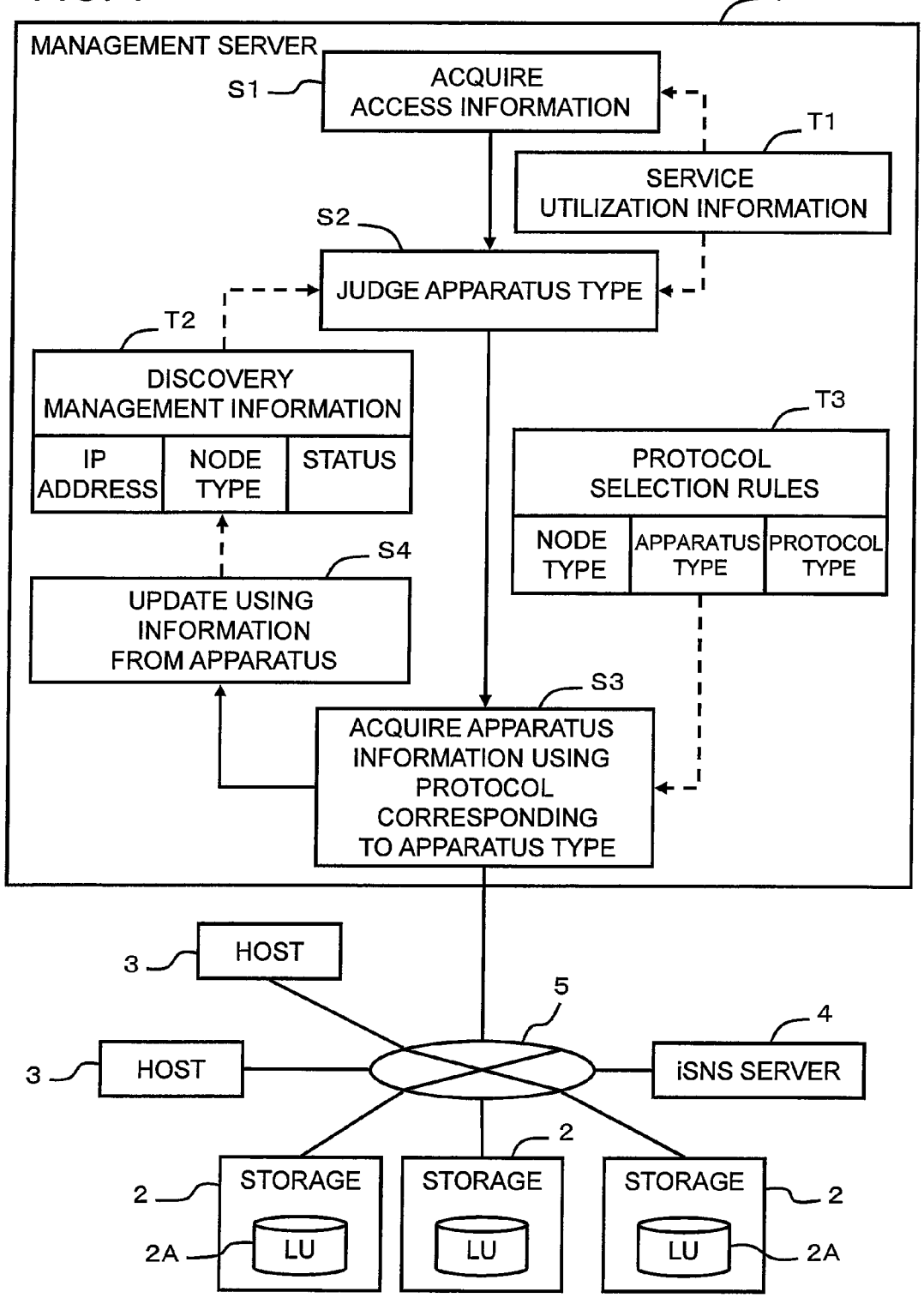
FIG. 1 is an illustrative view of the overall concept of an embodiment of the present invention.

1 . . . management server
2 . . . storage apparatus
3 . . . host
4 . . . iSNS server
5 . . . communication network
T1 . . . service utilization information
T2 . . . discovery management information
T3 . . . protocol selection rules
10 . . . host
20 . . . storage apparatus
30 . . . management server
40 . . . iSNS server
CN . . . communication network

BEST MODE FOR CARRYING OUT THE INVENTION

Storage apparatus, provided separately from host computers (referred to hereinafter as "host"), are used in enterprises or the like to manage large volumes of data. Storage area can be used more effectively when a plurality of hosts have combined use of one or a plurality of storage apparatus, rather than the hosts each having a storage apparatus. Hence, storage area networks (SAN), in which a plurality of hosts are coupled to a plurality of storage apparatus via a communication network, have become popularized.

Conventional SAN are formed using Fibre channel technology, which excels when used for high-capacity burst transfers. Such SAN are called FC-SAN. FC-SAN use dedicated communication devices, cables and so on, which are FCP (Fibre Channel protocol)-compatible, and therefore allow comparatively stable data transfers to be performed. However, dedicated communication devices and so forth are costly, and require the services of technicians acquainted with FCP.

Hence, IP-SAN, which use Internet Protocol (IP) networks, have attracted attention in recent years. In an IP-SAN, a SCSI (Small Computer System Interface) command, for example, is encapsulated using TCP/IP (Transmission Control Protocol/Internet Protocol), and encapsulated packets are sent and received using an IP network. This technology is called iSCSI (Internet Small Computer System Interface) technology. iSCSI can be used to couple a storage apparatus directly to the IP network.

With iSCSI, a node that requests data processing or the like is known as an 'initiator' (iSCSI initiator), and a node that returns a response to the requested processing is called a 'target' (iSCSI target). A host may be an initiator and a storage apparatus a target, for example. Initiators and targets are specified by identifiers known as iSCSI names. By logging on to a target, an initiator is able to use services (storage services, for example) provided by the target.

In order to centrally manage information related to apparatus capable of communicating using the iSCSI protocol, an iSNS (Internet Storage Name Service) server is provided. The iSNS server handles name resolution for the respective iSCSI initiator nodes and iSCSI target nodes. The iSNS server also implements functions such as an access restriction function for the iSCSI initiators and iSCSI targets, using discovery domains.

By pre-registering the IP address and the iSCSI name of a target in an initiator, the initiator is able to open a session to a target. A session is a logical communication path configured in a physical communication path.

When a session is opened, authentication is performed between the initiator and the target. This serves to prevent unauthorized access. Authentication can be carried out by at least either one or both of the target and initiator.

Authentication processing is performed, for example, based on whether or not a user name (user ID) and secret (password) communicated by the initiator match a user name and secret that are registered with the target. When both user names and secrets match, authentication is successful, and the initiator is granted the right to access the target.

In an IP-SAN environment, a management apparatus (more precisely, management software running on the management apparatus) acquires information on the composition of each host and each storage apparatus. The management apparatus periodically acquires information such as the internal composition of each component such as communication ports, controllers, cache, logical volumes, RAID (Redundant Arrays of Independent Disks) groups in the storage apparatus, and information such as the communication ports of the storage apparatus to which logical volumes on the host are coupled, for example, and records this information in a database on the management apparatus.

The administrator designates an address range for the monitoring target apparatus when host computers and storage apparatus, serving as acquisition targets for the composition information, are configured in the management apparatus. The management apparatus periodically attempts information acquisition from each address included in the designated address range. When an apparatus responds to the information acquisition from the management apparatus, the management apparatus adds the apparatus at that address to the information acquisition target.

Although not directly related to information processing systems with hosts and storage apparatus, a technology is known which scans for the presence of devices in a designated IP address range and performs authentication on the discovered devices in order to acquire information from those devices for which authentication is successful (Japanese Laid-open Patent Publication 2005-175736).

Embodiments of the present invention will be described hereinbelow with reference to the drawings. First, an overview of the present invention will be provided, followed by a description of the embodiments. As will be described subsequently, according to the present invention, apparatus in a pre-designated address range are efficiently discovered and accessed (depending on the apparatus, authentication may be required), and other apparatus outside the designated address range are also discovered, based on addresses (information enabling access) configured in the accessed apparatus.

FIG. 1 is a schematic diagram providing an overview of an embodiment of the present invention. The following description of FIG. 1 outlines the present invention to the extent required to understand and carry out the invention, but the scope of the present invention is not limited to the composition shown in FIG. 1.

The information processing system shown in FIG. 1 comprises, for example, a management server 1, a plurality of storage apparatus 2, a plurality of hosts 3, and an iSNS server 4, these computer apparatus 1 to 4 being coupled to one another via a communication network 5 such as the Internet.

Apparatus 2 to 4 will be described before the management server 1. A host (abbreviation for 'host computer') 2, serving as a 'host apparatus', is designed as a computer apparatus such as a server computer, for example, and provides predetermined services to a client computer, not included in the drawings. Examples of predetermined services may include electronic mail processing, customer management, sales management, the distribution of content data such as movies or news items, document creation processing, spreadsheet processing, and schedule management.

The storage apparatus 2 comprises a plurality of logical volumes 2A. In FIG. 1, the logical volumes are shown as 'LU' (Logical Unit). The logical volumes 2A are created from a physical storage area in one or a plurality of storage devices. Examples of storage devices may include a variety of data-read/writable storage devices such as hard disk devices, semiconductor memory devices, optical disk devices, magneto-optical disk devices, and magnetic tape devices.

In cases where hard disk devices are used, possible disks include, for example, FC (Fibre Channel) disks, SCSI (Small Computer System Interface) disks, SATA disks, ATA (AT Attachment) disks, and SAS (Serial Attached SCSI) disks. The storage devices used can be, for example, flash memory, FeRAM (Ferroelectric Random Access Memory), MRAM (Magnetoresistive Random Access Memory), ovonic unified memory, RRAM (Resistance RAM), and PRAM (Phase change RAM). There may also be a mixture of different types of storage devices such as flash memory devices and hard disk drives, for example, in the same storage apparatus.

An iSNS server 4, serving as a 'name management apparatus', manages an iSCSI name and IP address for each of the iSCSI target nodes and iSCSI initiator nodes in an IP-SAN using iSCSI.

The composition of the management server 1 will now be described. The management server 1, which serves as a 'management system' or 'management apparatus', is a computer apparatus for managing the apparatus (nodes) present on the IP-SAN.

The management server 1 can comprise one or a plurality of computers. A set, which includes the management server 1, and a client computer (operation and display computer) coupled to the management server 1, can be called a management apparatus or management system. Furthermore, to increase processing speeds, management may be performed using a plurality of computers.

The management server 1 acquires access information for accessing each apparatus (the storage apparatus 2 and the hosts 3) (S1), and judges the respective apparatus types (S2), for example. The management server 1 then uses communication protocols that correspond to the judged apparatus types to authenticate the apparatus (S3).

The management server 1 acquires IP addresses, serving as 'access information', from service utilization information T1. The service utilization information T1 provides information on the services provided over the network (storage services, for example). The service utilization information T1 includes, for example, information indicating which apparatus is using the services of which apparatus, and information enabling access to the apparatus (the IP addresses and iSCSI names, and so on, for example). Examples of service utilization information T1 may include an iSCSI name management table (see FIG. 16) managed by the iSNS server 4. In addition, information indicating which hosts are sharing a specific logical volume, such as when file sharing services are used, for example, can be used as service utilization information T1.

Discovery management information T2 manages information on each discovered apparatus. The discovery management information T2 includes, for example, the IP address of each discovered apparatus (node), the node type of each apparatus (host, storage apparatus, switch, and so forth, for example), the status of each apparatus (discovery completion status, discovery waiting status, and discovery failure status). The management server 1 is capable of judging the type of each apparatus on the basis of the service utilization information T1 and the discovery management information T2 (S2).

Protocol selection rules T3, serving as 'communication protocol selection information', have predefined communication protocols suitable for each apparatus. The protocol selection rules T3 manage node types, apparatus types, and protocol types in association with one another, for example. 'Node type' denotes the type of each apparatus (node), and 'apparatus type' indicates the type of group to which the node belongs.

Hence, the apparatus type may instead be expressed as the group type. Alternatively, the node type may be called a first type and the apparatus type may be called a second type. The first type represents the type of each apparatus, and the second type represents the type of group to which the first type belongs. The second type may also be thought of as a superordinate concept of the first type.

The protocol type denotes one or a plurality of communication protocols suitable for each apparatus. The management server 1 searches the protocol selection rules T3 on the basis of the node type of each apparatus, and selects a communication protocol that is suitable for each apparatus. The management server 1 then uses the selected communication protocol to access and authenticate each apparatus. In other words, when it is judged that an apparatus for which authentication is going to be attempted is a host, the management server 1 performs authentication using a host communication protocol. When it is judged that the apparatus to be authenticated is a storage apparatus, the management server 1 performs the authentication using a storage-apparatus communication protocol.

The management server 1 acquires composition information and the like from each apparatus, and updates discovery management information T2 on the basis of the information acquired. The management server 1 is capable of performing additional discovery processing on the basis of the updated discovery management information T2. This will be described in detail subsequently, but the management server 1 acquires information, relating to another apparatus that uses the apparatus, from an authenticated apparatus, and registers the node type and IP address of the other apparatus in the discovery management information T2. The management server 1 then uses a communication protocol corresponding to the node type of the other apparatus to authenticate the other apparatus.

According to this embodiment, which has the composition described above, each apparatus in an address range designated by an administrator can be efficiently detected, and the time required to complete the processing can be shortened. Furthermore, according to the present invention, apparatus outside the designated address range can also be efficiently discovered in succession, whereby usability improves. This embodiment will be described in detail hereinbelow.

First Embodiment

Figure 2:
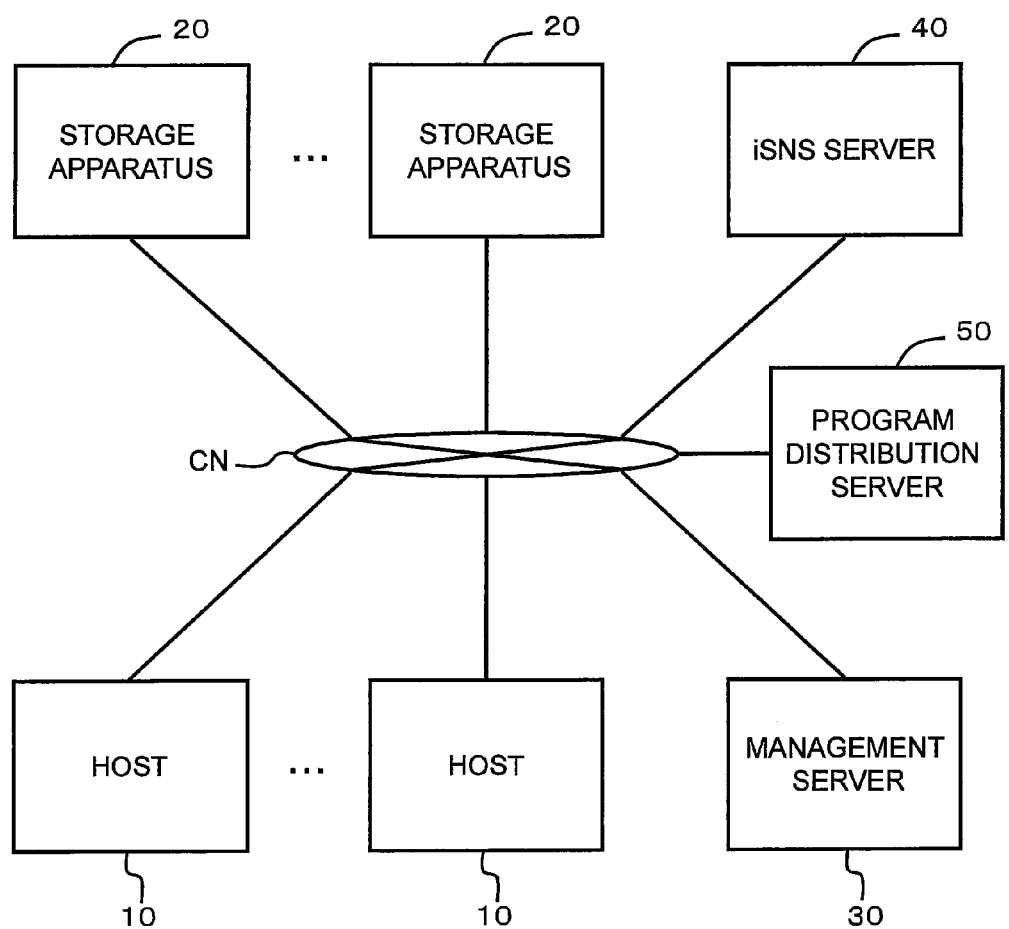
FIG. 2 is an illustrative view of the overall composition of an information processing system.

FIG. 2 is an illustrative view of the overall composition of the information processing system, comprising a management server 30, according to this embodiment. This information processing system comprises a plurality of hosts 10, a plurality of storage apparatus 20, at least one management server 30, at least one iSNS server 40, and at least one program distribution server 50, for example. The apparatus 10 to 50 are coupled to one another via a communication network CN such as the Internet.

The relationship of FIG. 2 to FIG. 1 will now be described. The host 10 corresponds to the host 3; the storage apparatus 20 corresponds to the storage apparatus 2; the management server 30 corresponds to the management server 1; and the iSNS server 40 corresponds to the iSNS server 4. The logical volume 24 (see FIG. 4) corresponds to the logical volume 2A; the iSCSI name management table 432 (see FIGS. 6 and 16) corresponds to the service utilization information T1; the discovery management table 335 (see FIGS. 5 and 14) corresponds to the discovery management information T2; and the protocol selection rules 337 (see FIGS. 5 and 15) correspond to the protocol selection rules T3.

The program distribution server 50 is a computer for distributing predetermined computer programs to the management server 30. The management server 30 executes each management processing operation (described subsequently) by installing the predetermined computer programs received from the program distribution server 50. Note that, in addition to being distributed by the program distribution server 50 via the communication network CN, the predetermined computer programs can also be distributed by being secured to a recording medium. The management server 30 is able to install the predetermined computer programs by reading the programs from the recording medium.

Figure 3:
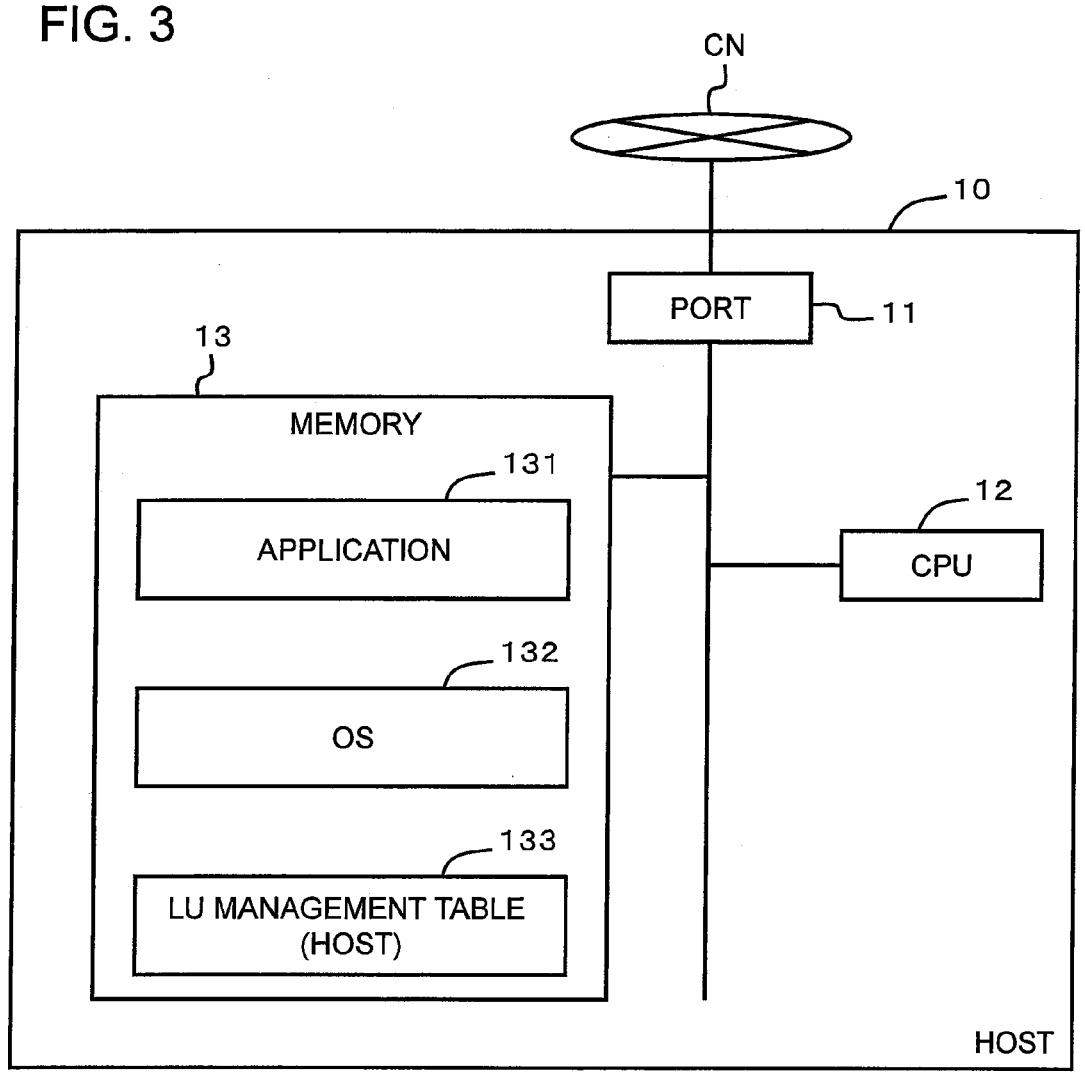
FIG. 3 is a schematic diagram of a host computer.

FIG. 3 shows the composition of the host 10. The host 10 comprises a communication port 11, a processor 12, and a memory 13, for example. These devices 11 to 13 are coupled to one another via an internal bus. Note that the processor is shown in FIG. 3 as 'CPU' (Central Processing Unit).

The memory 13 stores a business application program (referred to hereinafter as 'application') 131, an operating system 132, and a logical volume management table 133, for example. The logical volume management table 133 will be described in detail subsequently.

The application 131 uses storage areas provided by the operating system 132, and inputs and outputs data to and from these storage areas. Data input/output will be abbreviated hereinafter to I/O (Input/Output).

The operating system 132 causes the application 131 to recognize logical volumes 26, in the storage apparatus 20 coupled to the hosts 10 via the communication network CN, as the storage areas. Note that, FIG. 3 shows a single communication port 11, but the composition is not limited to one port, and may include an I/O port for communicating with the storage apparatus 20 using iSCSI, and a management port enabling the management server 30 to acquire management information in the hosts 10.

Figure 4:
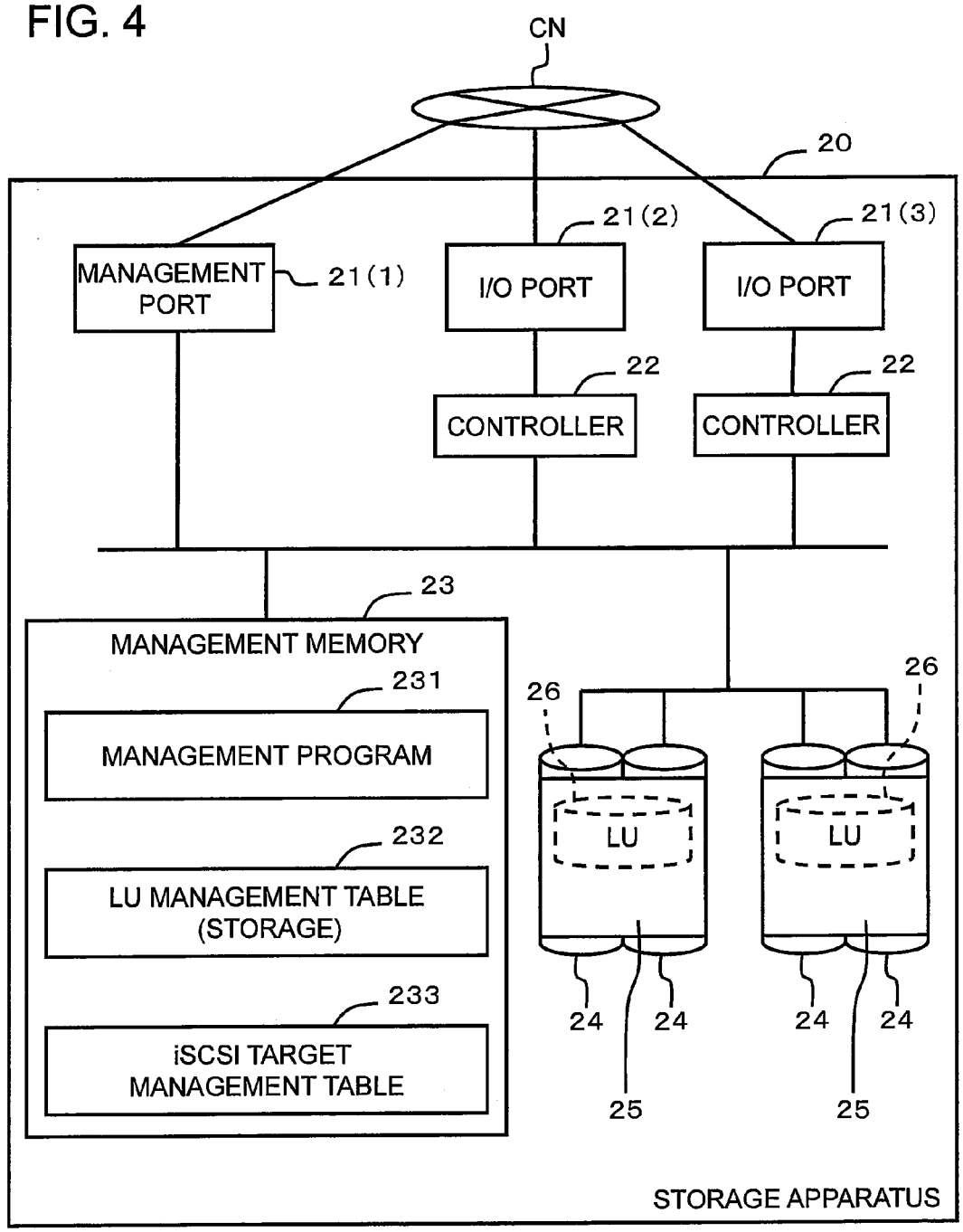
FIG. 4 is a schematic diagram of a storage apparatus.

FIG. 4 shows the composition of the storage apparatus 20. The storage apparatus 20 comprises, for example, a management port 21(1), I/O ports 21(2) and 21(3), controllers 22, a management memory 23, and storage devices 24.

The management port 21(1) is used to send and receive management information to and from the management server 30. The I/O ports 21(2) and 21(3) are used to send and receive data to and from the hosts 10.

Each controller 22 controls the operation of the storage apparatus 20. Even when one controller 22 stops, for instance due to failure, the storage apparatus 20 can be operated by the other controller 22. The controllers 22 each comprise an electronic circuit of a microprocessor and cache memory and so on, for example. The controllers 22 each control the exchange of data between the hosts 10 and the storage devices 24.

The management memory 23 stores a management program 231 for managing the storage apparatus 20, a logical volume management table 232, and an iSCSI target management table 233, for example. The tables 232 and 233 will be described in detail subsequently. Note that, to distinguish between the logical volume management table 133 in the hosts 10 and the logical volume management table 232 in the storage apparatus 20, '(host)' or '(storage)' has been added to the drawings, directly after each table name.

As mentioned earlier, the storage devices 24 are designed as hard disk devices, flash memory devices, holographic memory, or other such devices, for example. The physical storage areas of the respective storage devices are grouped as RAID groups 25. The grouped storage areas are provided with logical volumes 26, which are logical storage areas. The logical volumes 26 are provided for the hosts 10 in association with a LUN (Logical Unit Number). Note that a RAID configuration need not necessarily be provided. The logical volumes 26 may also be provided in a physical storage area of a single storage device.

Figure 5:
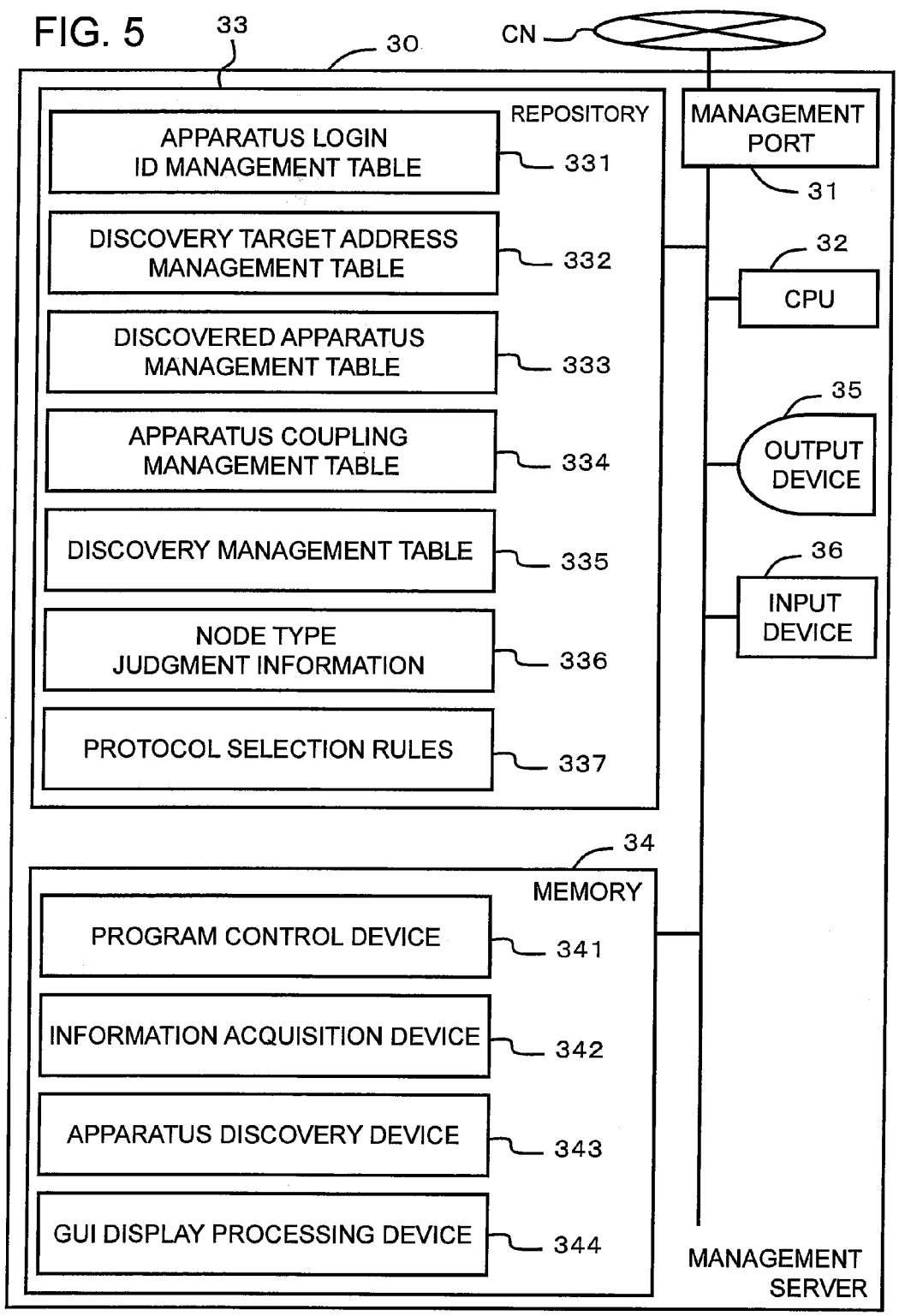
FIG. 5 is a schematic diagram of a management server.

FIG. 5 shows the composition of the management server 30. The management server 30 comprises, for example, a management port 31 for coupling the management server 30 to the communication network CN, a processor 32, a repository 33, a memory 34, an output device 35, and an input device 36.

The repository 33, which serves as the 'memory area', stores, for example, an apparatus login ID management table 331, a discovery target address management table 332, a discovered apparatus management table 333, a device coupling management table 334, a discovery management table 335, node type judgment information 336, and protocol selection rules 337. A repository means a storage hold for data in information technology, and is a type of database. Each of the tables 331 to 335, and 337 will be described subsequently. The node type judgment information 336 is information for judging the node type of each apparatus. The node type judgment information 336 records information such as 'the initiator node utilizing the storage apparatus is the host', for example.

The memory 34 stores computer programs for implementing functions such as a program control part 341, an information acquisition part 342, an apparatus discovery part 343, and a GUI (Graphical User Interface) display processing part 344, for example. The computer programs 341 to 344 are read and executed by a microprocessor 32.

The program control part 341 is responsible for controlling the respective monitoring target apparatus on the communication network (the hosts 10, storage apparatus 20, and so on). The program control part 341 can also be called a monitoring target control device, for example. The program control part 341 instructs the information acquisition part 342 to periodically acquire composition information from the respective storage apparatus 20 and hosts 10 in the information processing system. Furthermore, the program control part 341 periodically instructs the apparatus discovery part 343 to detect storage apparatus 20 and hosts 10 that are added to the information processing system.

The information acquisition part 342 acquires composition information from the storage apparatus 20 and the hosts 10 and stores the information in the repository 33. The apparatus discovery part 343 periodically monitors the storage apparatus 20 and the hosts 10 coupled to the communication network CN and, upon discovering that a new apparatus has been coupled to the communication network CN, instructs the information acquisition part 342 to acquire composition information from the new apparatus.

The GUI display processing part 344 exchanges information with the administrator via the output device 35 and the input device 36. The administrator performs various operations using the input device 36. The GUI display processing part 344 displays information requested by the administrator, or error messages, and so forth, on the output device 35, for example. The management server 30 is able to collect, at regular or irregular intervals, operating status and performance information pertaining to each predetermined part in the storage apparatus 20. The management server 30 is likewise able to collect, at regular or irregular intervals, operating status and performance information pertaining to other predetermined parts in the hosts 10. The management server 30 is also able to process the respective operating status and performance information, and provide this information to the administrator.

The output device 35 is designed as a display device or the like, for example. The input section 36 comprises a keyboard switch and a pointing device, or the like, for example. However, the output device 35 and input section 36 are not limited to such designs. For example, the design may instead entail installing an apparatus capable of automatic speech recognition so that various operations can be performed in response to the administrator's speech.

Figure 6:
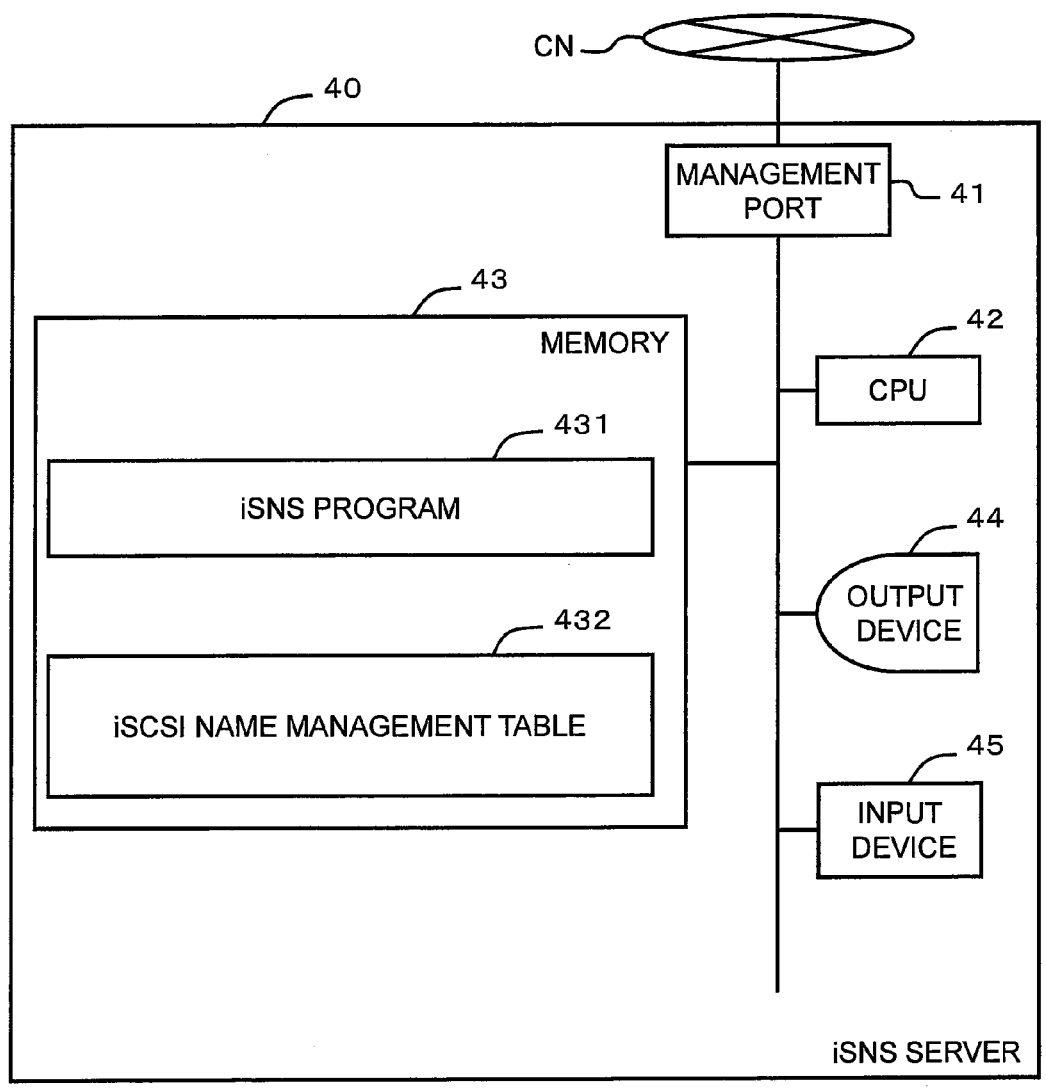
FIG. 6 is a schematic diagram of an iSNS server.

FIG. 6 shows the composition of the iSNS server 40. The iSNS server 40 includes, for example, a management port 41 for coupling to the communication network CN, a processor 42, a memory 43, an output device 44 such as a display device, and an input device 45 such as a keyboard switch or the like. These devices 41 to 45 are coupled to one another via a circuit such as an internal bus.

The memory 43 stores an iSNS program 431 and an iSCSI name management table 432, for example.

The iSNS program 431 stores information on each apparatus corresponding to the IP-SAN on the communication network CN in the iSCSI name management table 432. Furthermore, the iSNS program 431 searches the iSCSI name management table 432 in response to a request from each apparatus corresponding to the IP-SAN, and detects and sends back an IP address corresponding to a designated iSCSI name.

Examples of the composition of various information used in this embodiment will now be described on the basis of FIGS. 7 to 16. In this embodiment, various embodiment information will sometimes be described using expressions such as '* table', '* database', '* list', or '* queue', for example. However, the various information used in this embodiment need not necessarily be data structures such as tables, databases, lists, or queues, and may instead have another structure. In other words, the various information used in this embodiment is not dependent on specific data structures. Note that, in describing the various information used in this embodiment, various expressions such as 'identity information', 'identifiers', 'ID', and 'names', for example, may be used, but these various expressions are interchangeable.

FIG. 7 shows the composition of the logical volume management table 133 in the hosts 10. The logical volume management table 133 manages a drive name 1331, an iSCSI initiator name 1332, a coupling destination iSCSI target name 1333, and a LUN-ID 1334, for example.

The drive name 1331 is information identifying each of the logical volumes in the hosts 10. The iSCSI initiator name 1332 is information, used in communicating with the storage apparatus 20, for identifying the communication ports 11 of the hosts 10. In the following description, the hosts 10 are sometimes described as iSCSI initiators for convenience, but, strictly speaking, the iSCSI initiators are the ports 11 that are used in communications with the storage apparatus 20.

The coupling destination iSCSI target name 1333 is information, used in communicating with the storage apparatus 20, for identifying the I/O ports 21(2) and 21(3) of the storage apparatus 20. The LUN-ID 1334 is information for identifying the logical volumes 26 in the storage apparatus 20.

FIG. 8 shows the logical volume management table 232 in the storage apparatus 20. The logical volume management table 232 manages a VOL-ID 2321, a size 2322, a target ID 2323, and a LUN-ID 2324, for example.

The VOL-ID 2321 is information for identifying each of the logical volumes 26 in the storage apparatus 20. The size 2322 indicates the storage capacity of the respective logical volumes 26. The target ID 2323 is an identifier of the iSCSI target (I/O port) to which each logical volume 26 belongs. The LUN ID 2324 is information, in the iSCSI target, for identifying each logical volume belonging to the iSCSI target.

FIG. 9 shows the composition of the iSCSI target management table 233 of the storage apparatus 20. The iSCSI target management table 233A manages, for example, a target ID 2331, an iSCSI target name 2332, and an iSCSI initiator name 2333 for which coupling is allowed.

The target ID 2331 is information for identifying an iSCSI target in the storage apparatus 20. The iSCSI target name 2332 is the name of the iSCSI target. The iSCSI initiator name 2333, for which coupling is allowed, is the iSCSI initiator (communication port 11 of the host 10) that is allowed access to the logical volume 26 belonging to the iSCSI target.

FIG. 10 shows the composition of the apparatus login ID management table 331, which the management server 30 comprises. The apparatus login ID management table 331 manages, for example, an apparatus type 3311, a user name 3312, and a password 3313.

The apparatus type 3311 denotes an apparatus type of a discovery target. Examples of discovery-target apparatus types may include 'host', 'storage', 'iSNS server', and 'switch'. The user name 3312 is a portion of the authentication information that is used in cases where the apparatus discovery part 343 accesses a discovery target apparatus. The password 3313 performs another part of the authentication information and is used in conjunction with the user name 3312.

Figure 11:
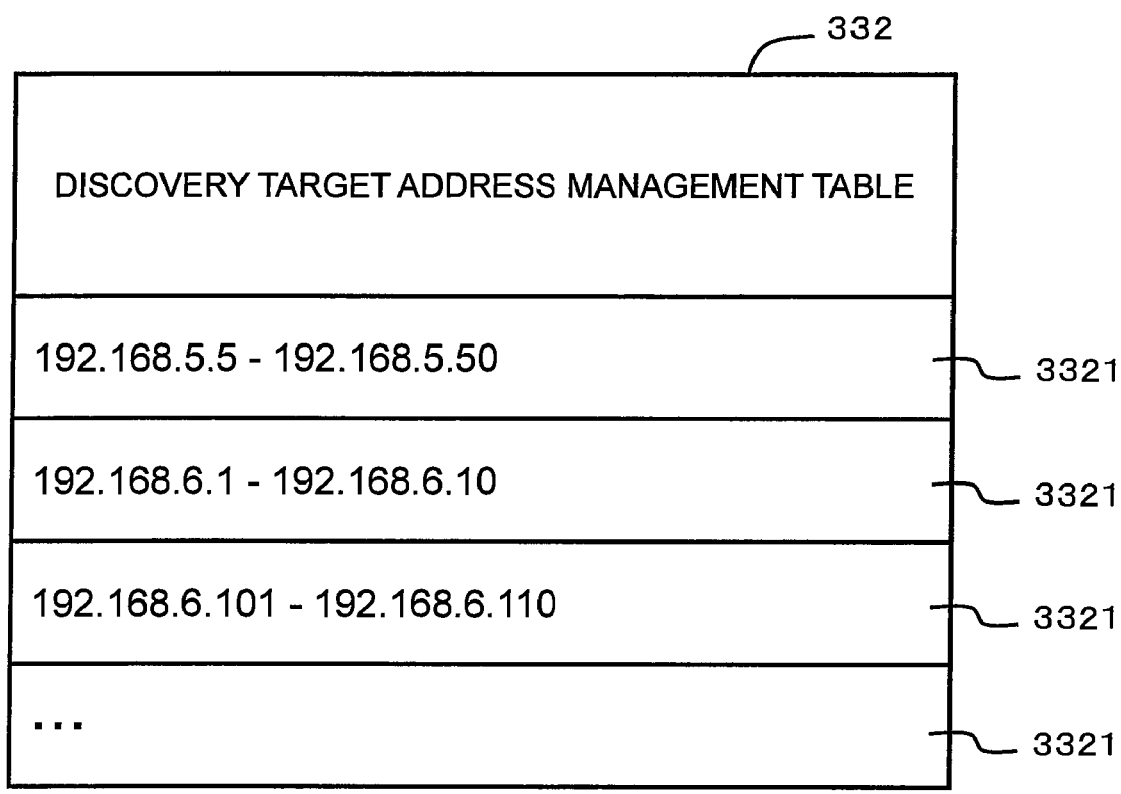
FIG. 11 is a schematic diagram of a discovery target address management table in the management server.

FIG. 11 shows the composition of the discovery target address management table 332, which the management server 30 comprises. The discovery target address management table 332 manages one or a plurality of discovery target address ranges 3321. The apparatus discovery part 343 attempts access to each IP address in the address range of 3321.

FIG. 12 shows the composition of the discovered apparatus management table 333 in the management server 30. The discovered apparatus management table 333 manages, for example, an IP address 3331, an apparatus type 3332, an apparatus ID 3333, a monitoring target flag 3334, a user name 3335, and a password 3336.

The IP address 3331 is information indicating the whereabouts, on the communication network CN, of the apparatus (hosts 10, storage apparatus 20, iSNS server 40, and so on) that are discovered by the apparatus discovery part 342. The apparatus type 3332 is information indicating the type of apparatus discovered by the apparatus discovery part 343. The apparatus ID 3333 is information for identifying the discovered apparatus in the management server 30.

The monitoring target flag 3334 is information indicating whether or not a discovered apparatus is a composition information acquisition target. When this flag is set to 'Yes', the apparatus is a composition information acquisition target, and the composition information is then acquired by the information acquisition part 342. The user name 3335 and the password 3336 is authentication information that is used when the information acquisition part 342 addresses a discovered device.

FIG. 13 shows the composition of the device coupling management table 334 of the management server 30. The device coupling management table 334 manages, for example, an apparatus ID 3341, a VOL-ID 3342, an iSCSI target name 3343, a LUN-ID 3344, an [access-] allowed iSCSI initiator name 3345, a coupling destination host ID 3346, and a coupling destination drive name 3347.

The apparatus ID 3341 is information that identifies each storage apparatus 20. The VOL-ID 3342 is information that identifies each logical volume 26 in the storage apparatus 20. The iSCSI target name 3343 is the iSCSI target name of the I/O ports 21(2) and 21(3), which are used when the logical volume 26 and host 10 communicate.

The LUN-ID 3344 is information for identifying each logical volume 26 belonging to the iSCSI targets. The allowed iSCSI initiator name 3345 is information for specifying the communication port 11 in the host 10 that is allowed access to the logical volume 26.

The coupling destination host ID 3346 is information for identifying the host 10 that uses the logical volume 26. The coupling destination drive name 3347 indicates the name of the drive, in the host 10, corresponding to the logical volume 26.

Note that when the management server 30 does not acquire composition information of the host 10, or when the logical volume 26 is not being used by any of the hosts 10, the coupling destination host ID 3346 and the coupling destination drive name 3347 have blank fields.

FIG. 14 shows the composition of the discovery management table 335 of the management server 30. The discovery management table 335 manages, for example, an IP address 3351, a node type 3352, and a discovery processing flag 3353.

The IP address 3351 is the IP address of a discovered apparatus. The node type 3352 indicates the node type of the discovered apparatus. The discovery processing flag 3353 is information indicating the status of discovery processing. Examples of the discovery processing status include 'complete', 'waiting', 'failed', or the like. 'Complete' indicates a status where discovery processing is complete. 'Waiting' indicates a status of awaiting the start of discovery processing. 'Failed' indicates a status where discovery processing has failed for whatever reason.

FIG. 15 shows protocol selection rules 337 of the management server 30. The protocol selection rules 337 manage, for example, a node type 3371, an apparatus type 3372, and a protocol type 3373.

The node type 3371 indicates the type of each apparatus (node) corresponding to network communications. Examples of node types include 'server', 'storage', 'switch', 'apparatus model A', 'apparatus model B', and 'apparatus model C'.

The apparatus type 3372 indicates the apparatus type associated with each apparatus. The apparatus type denotes a superordinate concept of the node type, that is, the type of the group to which each node belongs. Possible examples of apparatus types include 'host', 'storage', 'network', and so forth.

The protocol type 3373 indicates a communication protocol corresponding to each node type. WMI (Windows Management Instrumentation) and SSH (Secure SHell) pre-associated as communication protocols suitable for a 'server', for example. SMI-S (Storage Management Initiative-Specification), SNMP (Simple Network Management Protocol) are pre-associated as communication protocols suitable for 'storage', for example. SNMP is pre-associated as a communication protocol suitable for a 'switch', for example.

Furthermore, communication protocols A1 and A2 are pre-associated with 'apparatus model A', a communication protocol B1 is pre-associated with 'apparatus model B', and communication protocols C1 and C2 are pre-associated with 'apparatus model C'. These communication protocols A1, A2, B1, C1 and C2 are communication protocols specific to each apparatus model, for example.

The protocol selection rules 337 can be updated or extended if necessary. For example, when a new 'apparatus model D' is supported, a row relating to 'apparatus model D' may be provided in the protocol selection rules 337, and a communication protocol corresponding to 'apparatus model D' may be configured. The addition of the communication protocol to be supported can be handled by distributing updated protocol selection rules 337 from the program distribution server 50 to the management server 30, for example.

FIG. 16 shows an example of the composition of the iSCSI name management table 432 that the iSNS server 40 comprises. The iSCSI name management table 432 manages, for example, an IP address 4321, an iSCSI name 4322, and an iSCSI name type 4323.

The IP address 4321 indicates the IP address of the iSCSI initiator or iSCSI target. The iSCSI name 4322 is information that identifies the iSCSI initiator or the iSCSI target. The iSCSI name type 4323 is information indicating whether the IP address belongs to the iSCSI initiator or the iSCSI target.

Figure 17:
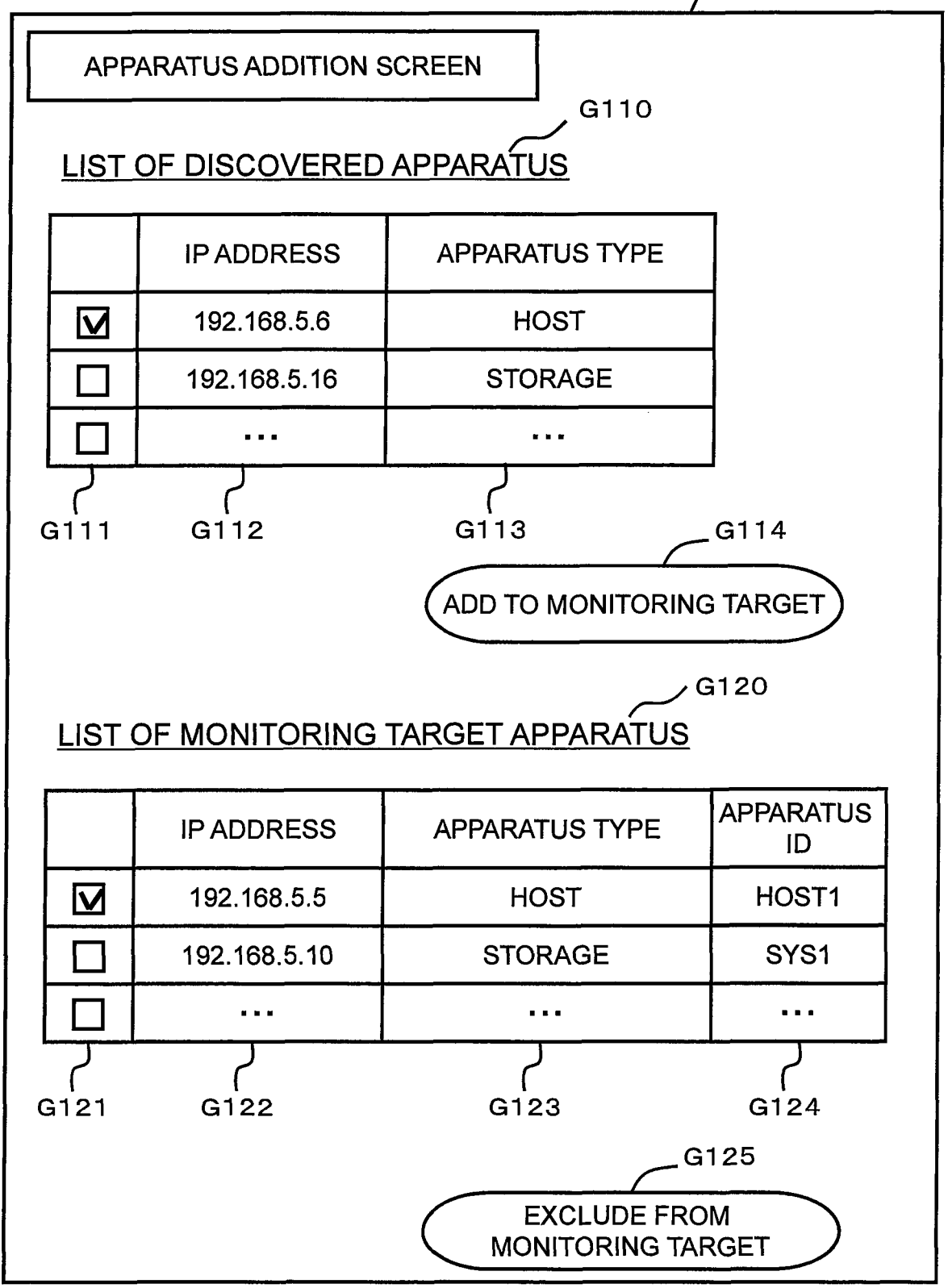
FIG. 17 shows a management screen for adding or deleting monitoring target apparatus.

FIG. 17 shows a management screen G10, provided by the management server 30, for adding apparatus. The management screen G10 is used when adding a discovered apparatus to the monitoring targets, and when removing an apparatus registered as a monitoring target from the monitoring targets.

The management screen G10 comprises a discovered-apparatus list display device G110, a button G114 for adding apparatus to the monitoring targets, a monitoring-target apparatus list display device G120, and a button G125 for removing apparatus from the monitoring targets, for example.

The discovered apparatus list display device G110 displays each of the apparatus discovered on the IP-SAN in the form of a list. The display device G110 includes, for example, a designation device G111, an IP address display device G112, and an apparatus type display device G113. The designation device G111 is for designating apparatus added to the monitoring targets. The IP address display device G112 displays the IP addresses of the discovered apparatus. The apparatus type display device G113 displays the apparatus type of the discovered apparatus.

When there is an apparatus to be added to the monitoring targets, the administrator designates the apparatus via the designation device G111, and operates the button G114. The management server 30 periodically collects the composition information, internal state, and performance information, and so on for the apparatus added to the monitoring targets.

The monitoring target list display device G120 displays the monitoring target apparatus in the form of a list. The display device G120 includes, for example, a designation device G121, an IP address display device G122, an apparatus type G123, and an apparatus ID_G124.

The designation device G121 is used to designate apparatus to be removed from the monitoring targets. The IP address display device G122 displays the IP addresses of the monitoring target apparatus. The apparatus type G123 displays the apparatus types of the monitoring target apparatus. The apparatus ID_G124 displays identifiers for identifying the monitoring target apparatus. When there is an apparatus to be removed from the monitoring targets, the administrator designates the apparatus via the designation device G121 and operates the button G125. Composition information is not collected from an apparatus that has been removed from the monitoring targets. Collection of the internal state and performance information of an apparatus removed from the monitoring targets is also halted.

Operation of the management server 30 will now be described on the basis of the flowcharts of FIGS. 18 to 27. The following description is expediently provided with the focus on the functional devices implemented by the management server 30 or the computer programs. The computer programs are read and executed by the microprocessor 32, and implement predetermined functions by suitably using hardware resources such as communication port 31. The operation of the management server 30 can therefore be described with the focus on the computer programs or the functional devices implemented by the computer programs. Note that some or all of the computer programs may be implemented by hardware circuits.

Figure 18:
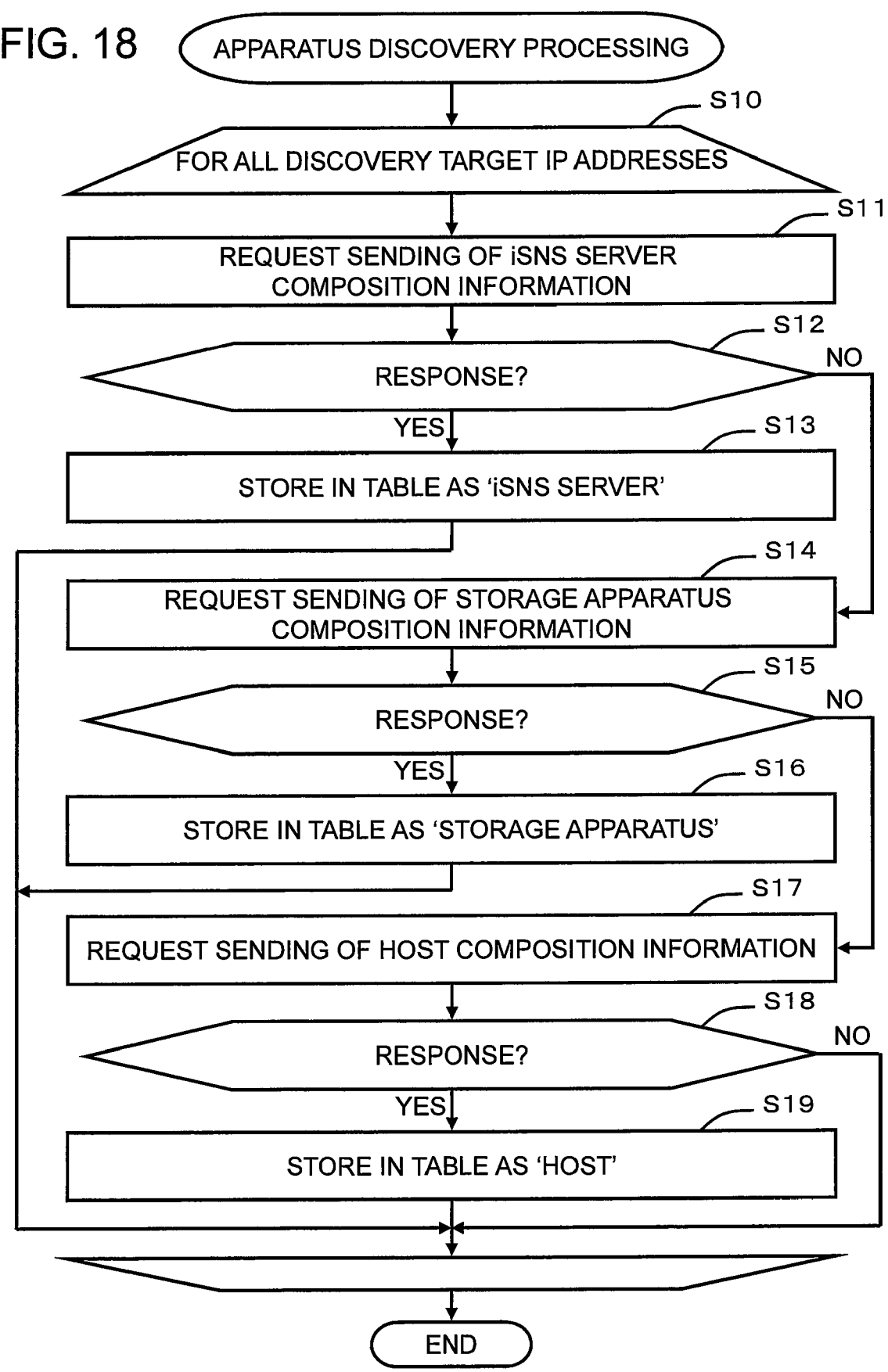
FIG. 18 is a flowchart for apparatus discovery processing.

FIG. 18 is a flowchart of the apparatus discovery processing implemented by the management server 30. The program control part 341 instructs the apparatus discovery part 343 to execute apparatus discovery processing when the program starts up, or whenever a fixed time has elapsed since the previous apparatus discovery processing.

The apparatus discovery part 343 performs loop processing on all the IP addresses within the discovery target address range defined in the discovery target address management table 332 (S10). The apparatus discovery part 343 uses the user name and password defined in the apparatus login ID management table 331 to log in to the apparatus ('monitoring target apparatus' hereinbelow) at the IP address defined in the discovery target address management table 332, and instructs this apparatus to send iSNS server composition information (S11). Note that the acquired composition information may be optional information.

The apparatus discovery part 343 judges whether or not iSNS server composition information has been sent back from the monitoring target apparatus (S12). In cases where there is a response containing iSNS server composition information from the monitoring target apparatus (S12: YES), the apparatus discovery part 343 judges the apparatus to be the iSNS server 40, and stores the IP address which generated the response in the discovered apparatus management table 333 (S13). The apparatus discovery part 343 configures the apparatus type as 'iSNS server', and configures the user name and password with the values used when the request to send composition information was made to the iSNS server 40. The apparatus discovery part 343 then moves to the next IP address.

In cases where there is no response containing iSNS server composition information from the monitoring target apparatus (S12: NO), the apparatus discovery part 343 requests that the monitoring target apparatus send storage apparatus composition information (S14).

The apparatus discovery part 343 judges whether or not there is a response containing the storage apparatus composition information from the monitoring target apparatus (S15). In cases where there is a response containing storage apparatus composition information from the monitoring target apparatus (S15: YES), the apparatus discovery part 343 judges this apparatus to be a storage apparatus, and stores the IP address which generated the response in the discovered apparatus management table 333 (S16). Thereupon, the apparatus type is configured as 'storage', and the user name and password are configured the values used when the request to send composition information was made to the storage apparatus 20. The apparatus discovery part 343 then moves to the next IP address.

In contrast, when there is no response containing storage composition information from the monitoring target apparatus (S15: NO), the apparatus discovery part 343 requests that the monitoring target apparatus send host apparatus composition information (S17).

The apparatus discovery part 343 judges whether or not there is a response containing host composition information from the monitoring target apparatus (S18). When there is a response containing host composition information from the monitoring target apparatus (S18: YES), the apparatus discovery part 343 judges the apparatus to be the host 10, and stores the IP address which generated the response in the discovered apparatus management table 333 (S19). Thereupon, the apparatus type is configured as 'host' and the user name and password are configured with the values used when the request to send composition information was made to the host 10. The apparatus discovery part 343 then moves to the next IP address. Note that the apparatus discovery part 343 also moves on to processing of the next IP address in cases where there is no response containing host composition information from the monitoring target apparatus (S18: NO).

Figure 19:
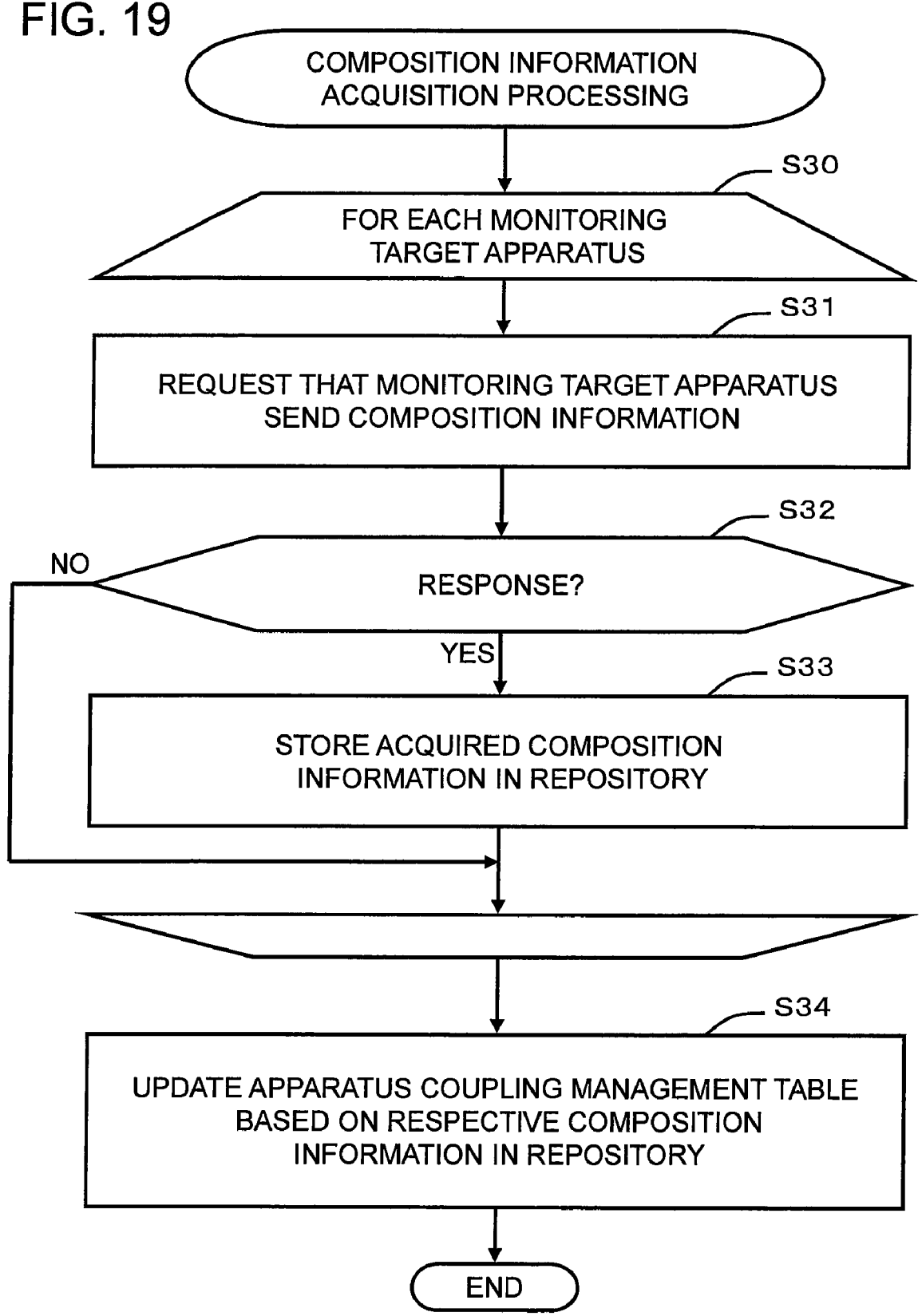
FIG. 19 is a flowchart for composition information acquisition processing.

FIG. 19 is a flowchart showing composition information acquisition processing that is implemented by the management server 30. The program control part 341 instructs the information acquisition part 342 to execute composition information acquisition processing when the program is started up or every time a fixed time has elapsed since the previous composition information acquisition processing.

The information acquisition part 342 repeats the loop processing (serial processing hereinbelow) for each apparatus of the monitoring targets defined in the discovered apparatus management table 333 (S30). The information acquisition part 342 uses the user name and password defined in the discovered apparatus management table 333 to log in to the apparatus, among the apparatus defined in this table 333, whose monitoring target flags 3334 are set to 'Yes' and requests that these apparatus send composition information (S31).

In S31, the information acquisition part 342 confirms the apparatus types registered in the table 333, and when an apparatus type is 'host', requests that the logical volume management table 133 be sent. In contrast, when the apparatus type is 'storage' in S31, the information acquisition part 342 requests that the logical volume management table 232 and the iSCSI target management table 233 be sent.

The information acquisition part 342 judges whether or not there is a response containing composition information from the monitoring target apparatus (S32). When there is a response from the monitoring target apparatus (S32: YES), the information acquisition part 342 stores the acquired composition information in the repository 33 (S33).

After the processing steps S31 to S33 have ended for all the apparatus of the monitoring targets defined in the discovered apparatus management table 333, the information acquisition part 342 references the respective composition information stored in the repository 33, and updates the device coupling management table 334 (S34).

The procedure for updating the device coupling management table 334 will now be described. First the information acquisition part 342 references the logical volume management table 232 stored in the repository 33, confirms the iSCSI target names to which the logical volumes 26 are coupled, and the iSCSI initiator names able to access the logical volumes 26, and registers these iSCSI target names and iSCSI initiator names in the device coupling management table 334.

The information acquisition part 342 then references the logical volume management table 133. The information acquisition part 342 checks the stored content of the logical volume management table 232 in the storage apparatus 20, and the stored content of the logical volume management table 133 in the hosts 10, and when matching content is found, stores the content in the device coupling management table 334.

In other words, (1) iSCSI initiators which are the same as the iSCSI initiator names in the table 232 are used, (2) coupled to storage ports with the iSCSI target names in the table 232, and (3) in cases where a pair including an in-storage logical volume 26 and an in-host drive, each with the same LUN-ID, is discovered, the information acquisition part 342 judges that the iSCSI target and the iSCSI initiator are in a mutually coupled relationship, and registers the pair in the device coupling management table 334.

Figure 20:
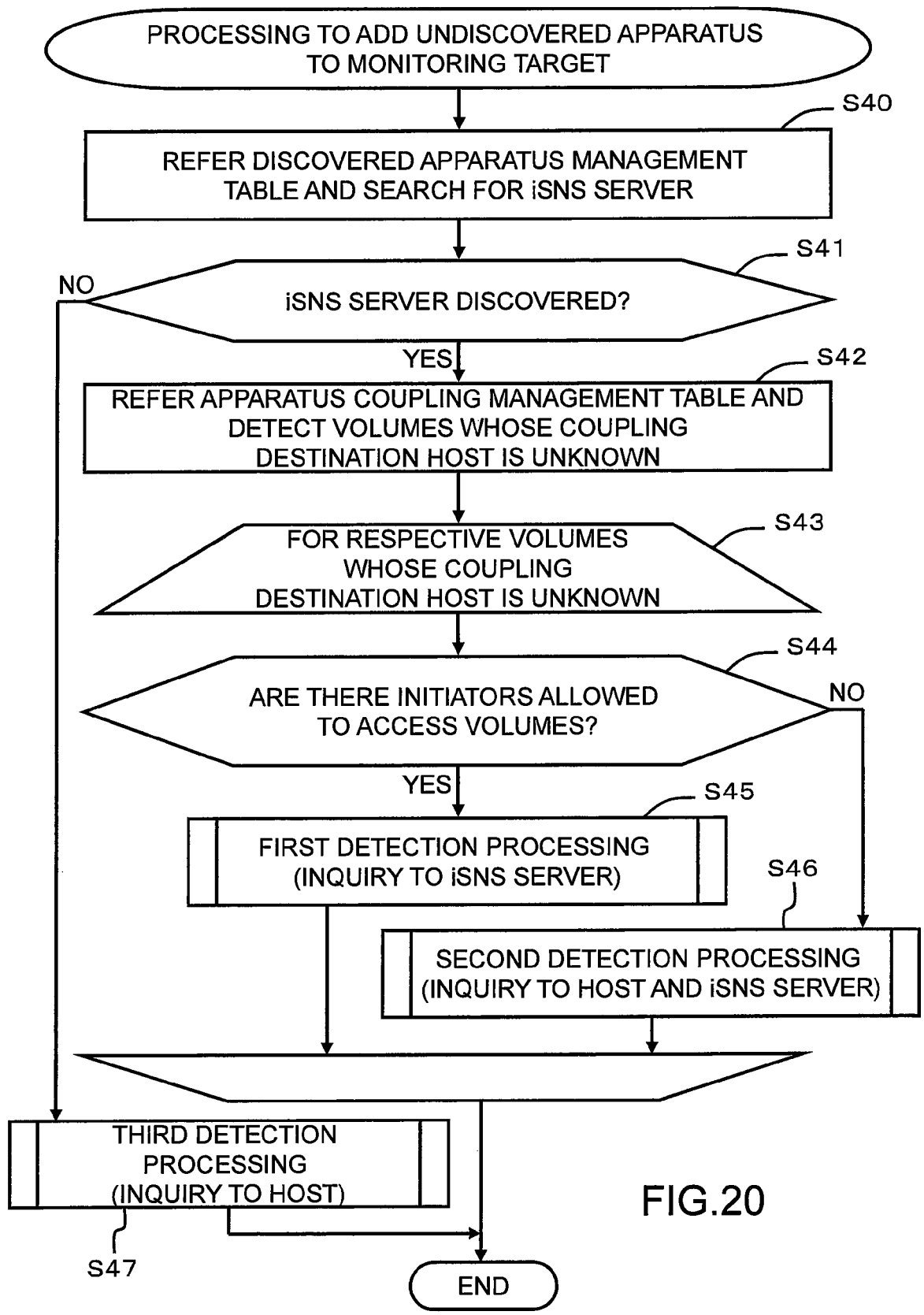
FIG. 20 is a flowchart for processing to discover undiscovered apparatus and add these apparatus to the monitoring targets.

FIG. 20 is a flowchart showing processing, performed by the management server 30, to add undiscovered hosts to the monitoring targets. This processing is executed by the program control part 341. This processing is started automatically immediately following completion of the apparatus discovery processing (see FIG. 18) and the composition information acquisition processing (see FIG. 19). However, the design may also be such that the processing is started in response to an instruction from the administrator.

The program control part 341 references the discovered apparatus management table 333 to search for the iSNS server 40 (S40), and judges whether or not the iSNS server 40 has been discovered (S41). When the iSNS server 40 has been discovered (S41: YES), the program control part 341 references the device coupling management table 334 to detect a list of in-storage logical volumes for which the coupling destination host is unknown (S42). The program control part 341 repeats the following steps for each of the detected logical volumes 26 (S43). The detected logical volumes are referred to hereinbelow as 'target volumes'.

The program control part 341 references the discovered apparatus management table 333, and judges whether or not iSCSI initiator names, for which access is allowed, are associated with the target volumes (S44).

Figure 21:
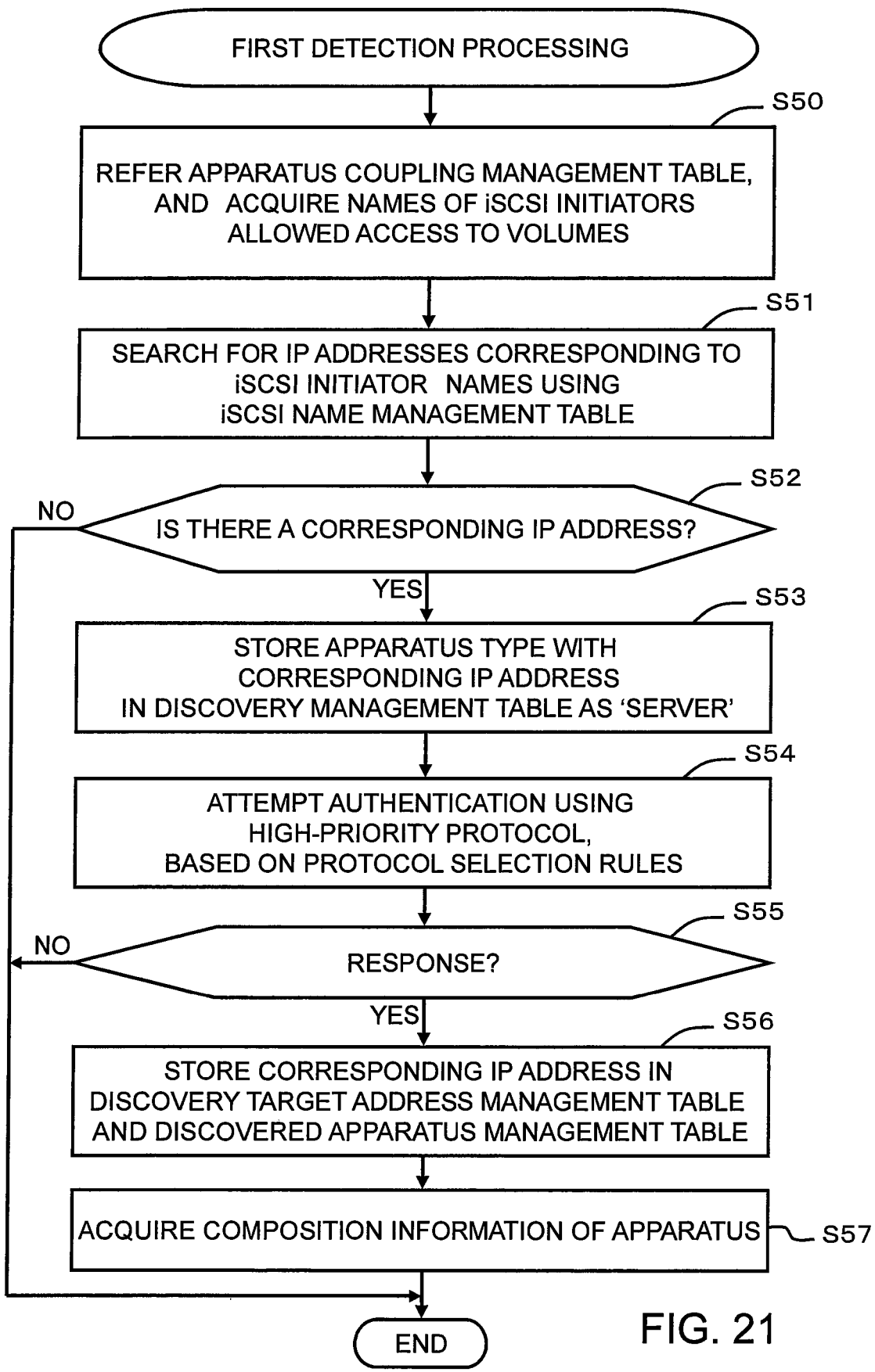
FIG. 21 is a flowchart for first detection processing, which is executed in the flowchart in FIG. 20.

In cases where the iSCSI initiator names allowed access to the target volumes have been registered (S44: YES), the program control part 341 executes first detection processing, which is shown in FIG. 21 (S45). Further details will be provided hereinafter, but, in the first detection processing, undiscovered. IP addresses are detected by sending an inquiry to the iSNS server 40.

Figure 22:
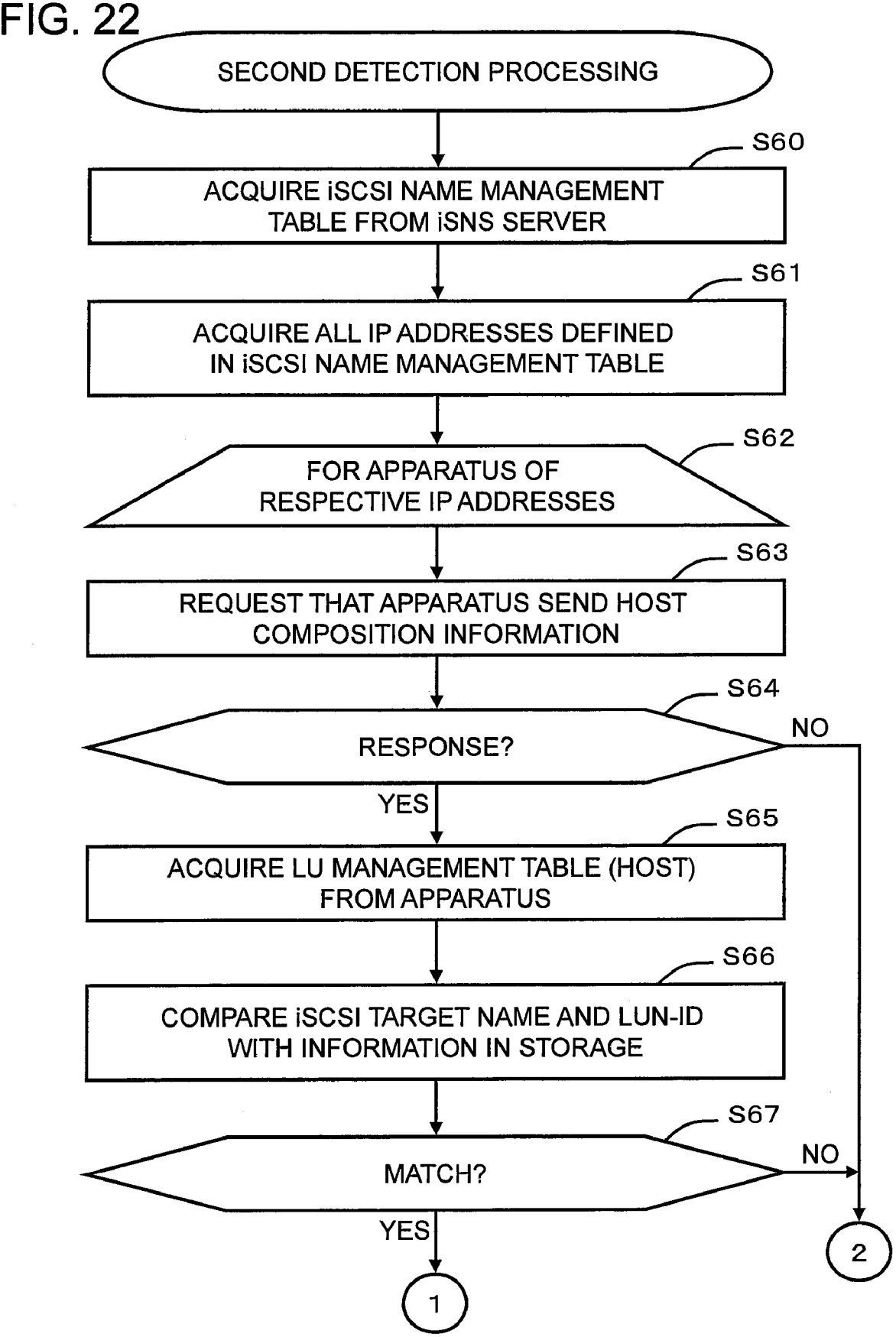
FIG. 22 is a flowchart for second detection processing, which is executed in the flowchart in FIG. 20.
Figure 23:
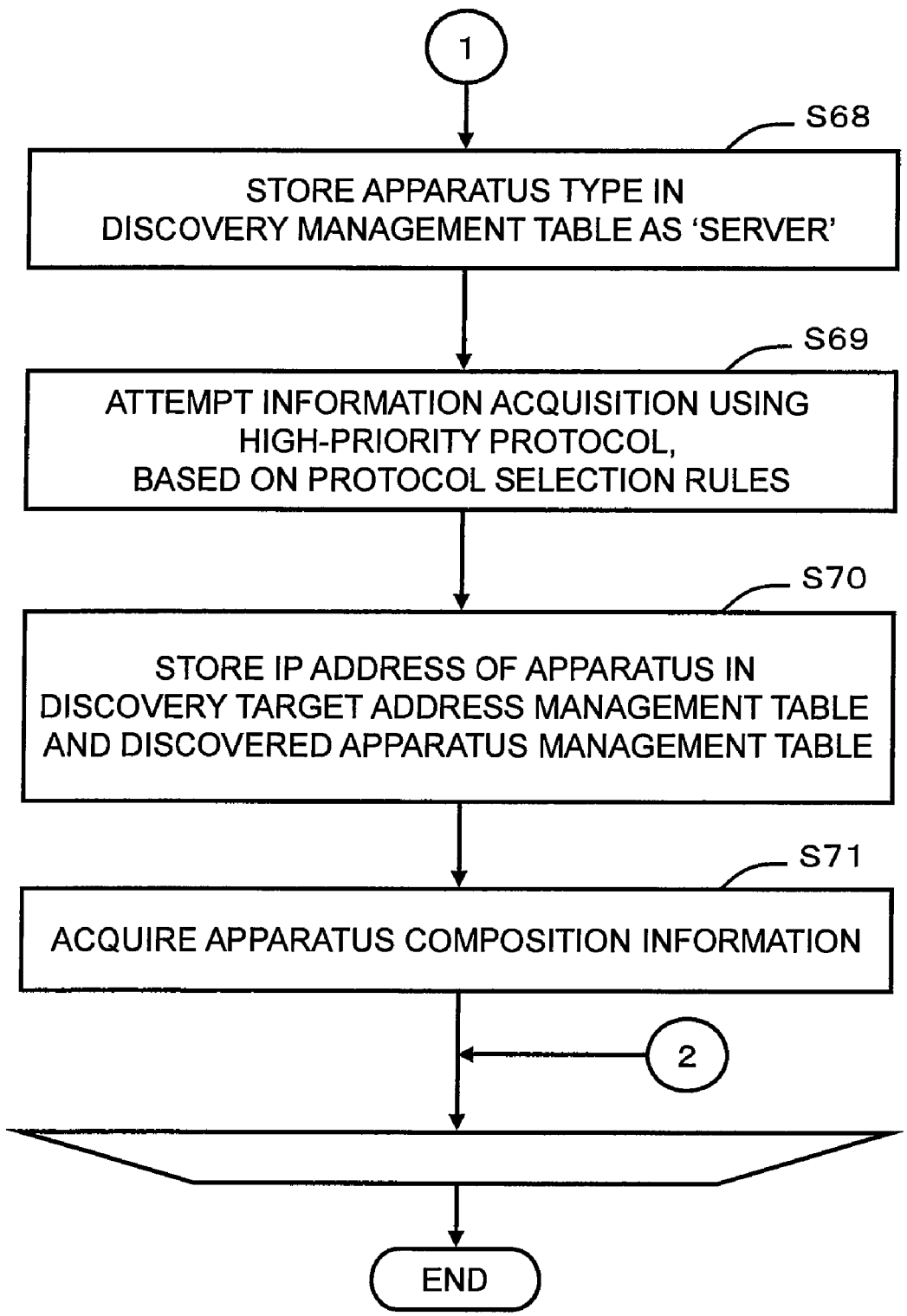
FIG. 23 is a flowchart that continues on from FIG. 22.

In cases where iSCSI initiator names allowed access to the target volumes have not been registered (S44: NO), the program control part 341 executes second detection processing, which is shown in FIG. 22 (S46). Further details will be provided subsequently, but, in the second detection processing, undiscovered IP addresses are detected by sending an inquiry to the iSNS server 40 and the hosts 10.

Figure 24:
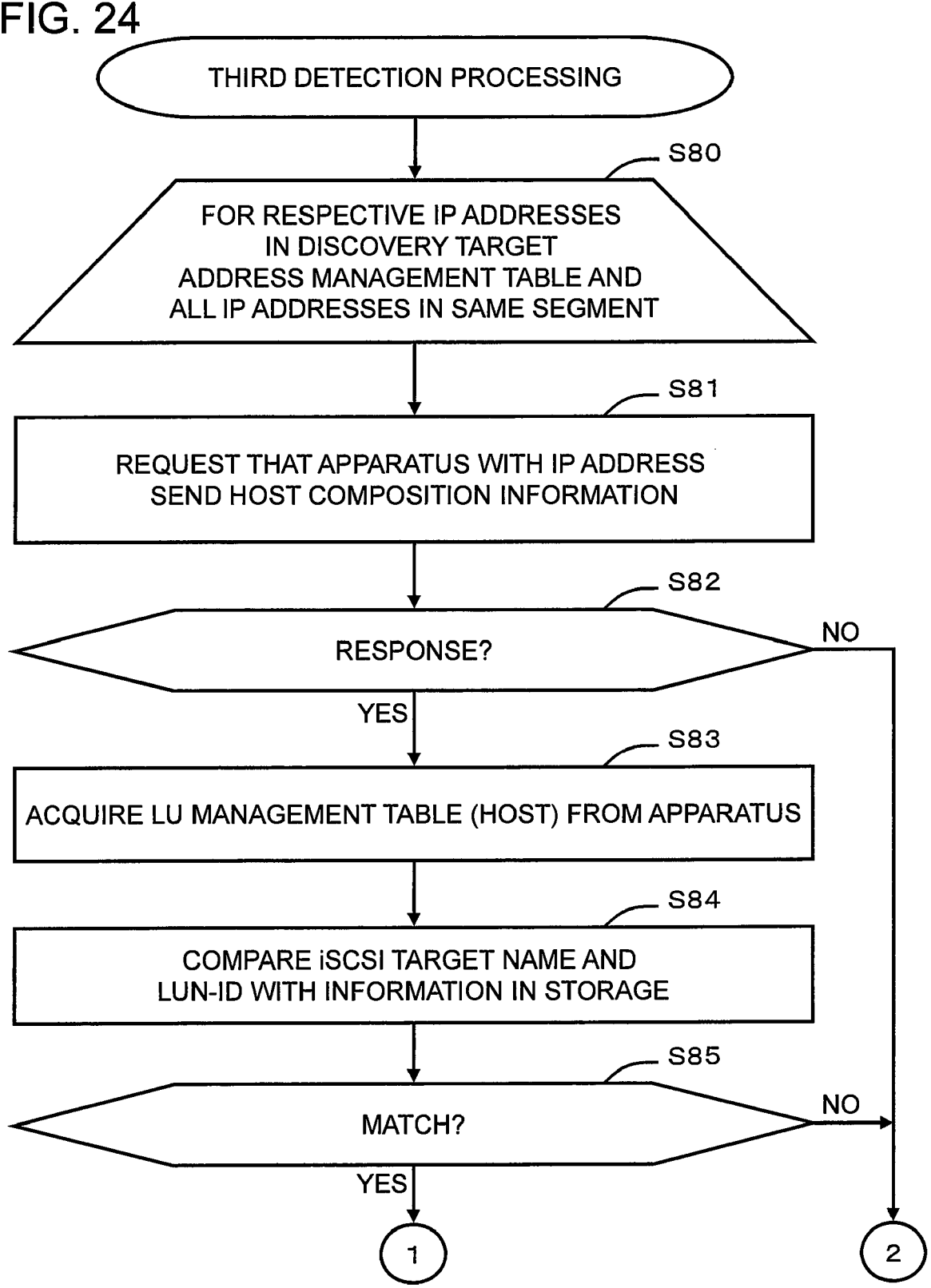
FIG. 24 is a flowchart for third detection processing, which is executed in the flowchart in FIG. 20.
Figure 25:
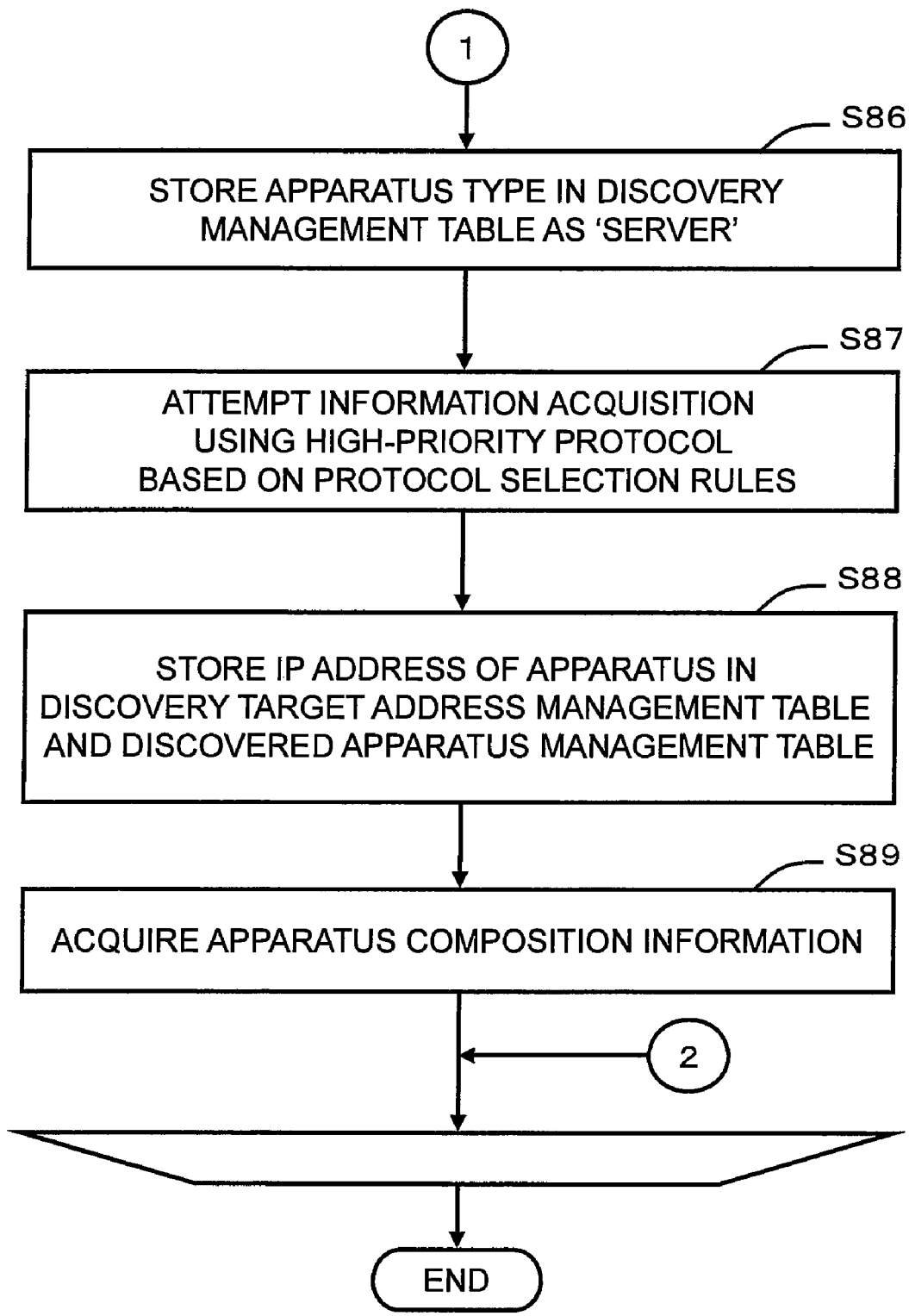
FIG. 25 is a flowchart that continues on from FIG. 24.

However, in cases where the iSNS server 40 is not discovered (S41: NO), the program control part 341 executes third detection processing, which is shown in FIG. 24 (S47). Further details will be provided subsequently, but, in the third detection processing, undiscovered IP addresses are detected by sending an inquiry to the hosts 10.

FIG. 21 is a flowchart showing the first detection processing in FIG. 20. The program control part 341 references the device coupling management table 334, and acquires iSCSI initiator names for which coupling to the respective logical volumes is allowed (S50).

The program control part 341 then instructs the information acquisition part 342 to acquire composition information from the iSNS server 40. In response to this instruction, the information acquisition part 342 executes steps S31 to S33 of the composition information acquisition processing shown in FIG. 19. As a result, the information acquisition section 342 acquires the iSCSI name management table 432 from the iSNS server 40, and stores the table 432 in the repository 33. Note that the information acquisition part 342 acquires the IP address of the iSNS server 40 from the discovered apparatus management table 333.

The program control part 341 references the acquired iSCSI name management table 432 and retrieves the IP addresses corresponding to the iSCSI initiator names detected in S50 (S51). The program control part 341 judges whether or not the IP addresses corresponding to the iSCSI initiator names detected in S50 are registered in the iSCSI name management table 432 (S52).

In cases where the corresponding IP addresses are not present in the iSCSI name management table 432 (S52: NO), the program control part 341 ends the processing and moves on to processing for the next logical volume.

In cases where the corresponding IP addresses have been registered in the iSCSI name management table 432 (S52: YES), the program control part 341 judges the node types of the apparatus with these IP addresses to be 'server', and stores this information in the discovery management table 335 (S53). The apparatus with these IP addresses are called target apparatus hereinbelow.

The program control part 341 references the protocol selection rules 337, uses a communication protocol suitable for 'server' to access the target apparatus, and attempts authentication (S54). In other words, the program control part 341 uses a high probability communication protocol to access the target apparatus, and attempts to acquire information from the apparatus. The access to and authentication of these apparatus is performed by the information acquisition part 342.

In cases where a plurality of communication protocols suitable for the node types of the target apparatus have been associated in the protocol selection rules 337, the information acquisition part 341 uses the communication protocols in order of priority. In cases where a plurality of communication protocols have been associated with a single node type, levels of priority are established in order to specify the order in which these communication protocols are used.

The program control part 341 judges whether there is a response from the target apparatus (S55). In cases where there is a response (S55: YES), the program control part 341 stores the IP addresses detected in S52 in the discovery target address management table 332 and the discovered apparatus management table 333 (S56).

In addition, the program control part 341 instructs the information acquisition part 342 to acquire host composition information from the apparatus at the aforementioned IP addresses (S57). After receiving the instruction, the information acquisition part 342 acquires the host composition information from the apparatus that generated the response in S55.

FIG. 22 is a flowchart showing the details of the second detection processing that appears in FIG. 20. The program control part 341 requests that the information acquisition part 342 acquire composition information from the iSNS server 40 (S60). The information acquisition part 342 accesses the iSNS server 40, acquires the iSCSI name management table 432 from the iSNS server 40, and stores this table 432 in the repository 33.

The program control part 341 references the iSCSI name management table 432, and acquires all the IP addresses defined (registered) therein (S61). The program control part 341 repeats the processing below for all the acquired IP addresses (S62).

The program control part 341 instructs the apparatus at the IP addresses (target apparatus hereinbelow) to send host composition information (step S63). The acquired composition information may be optional information.

The program control part 341 judges whether or not there is a response containing host composition information from the target apparatus (step S64). Here, the only apparatus which respond to the request to send host composition information are the hosts 10; the apparatus other than the hosts 10 (the storage apparatus 20 and so on) do not respond to the request in S63. In cases where there is no response with host composition information from the target apparatus (S64: NO), the program control part 341 ends the processing and moves on to processing of the next IP address.

In cases where there is a response from the target apparatus (S64: YES), the program control part 341 instructs the information acquisition part 342 to acquire the logical volume management table 133 from the target apparatus (S65). After receiving the instruction, the information acquisition part 342 acquires the logical volume management table 133 from the target apparatus, and stores the table 133 in the repository 33 (S65).

The program control part 341 then acquires the respective logical volume coupling destination iSCSI target names and LUN-ID from the logical volume management table 133, and compares these iSCSI target names and LUN-ID with the iSCSI target names and LUN-ID of the logical volumes 26 registered in the device coupling management table 334 (S66).

The program control part 341 judges whether or not the logical volumes with the same iSCSI target names and the same LUN-ID have been registered in the logical volume management table 133 (S67). In cases where logical volumes with the same iSCSI target names and the same LUN-ID are not present in the logical volume management table 133 (S67: NO), the program control part 341 ends the processing and moves on to processing of the next IP address.

When logical volumes with the same iSCSI target names and the same LUN-ID are in the logical volume management table 133 (S67: YES), the processing moves to FIG. 23. The program control part 341 stores the node types of the target apparatus in the discovery management table 335 as 'server' (S68).

The program control part 341 causes the information acquisition part 342 to attempt authentication of the target apparatus by sequentially using the communication protocols prepared for servers (S69). When authentication is successful, the program control part 341 stores the IP addresses of the target apparatus in the discovery target address management table 332 and the discovered apparatus management table 333 (S70).

Furthermore, the program control part 341 instructs the information acquisition part 342 to acquire host composition information from the target apparatus (S71). After receiving the instruction, the information acquisition part 342 acquires host composition information from the target apparatus, and stores this information in the repository 33.

FIG. 24 is a flowchart showing details of the third detection processing in FIG. 20. The program control part 341 of the management server 30 repeats the following processing for all the IP addresses in the same segments as the IP addresses which are registered in the discovery target address management table 332 (S80).

The program control part 341 instructs the apparatus (target apparatus hereinbelow) at the aforementioned IP addresses to send host composition information (S81). The program control part 341 judges whether or not there is a response containing host composition information from the target apparatus (S82).

A target apparatus only responds when the target apparatus is the host 10. In cases where the target apparatus is not the host 10, but the storage apparatus 20, or the like, the target apparatus does not respond to the request in S81. When there is no response containing host composition information from the target apparatus (S82: NO), the program control part 341 ends the processing and moves on to processing of the next IP address.

When there is a response from the target apparatus (S82: YES), the program control part 341 instructs the information acquisition part 342 to acquire the logical volume management table 133 from the target apparatus (S83). After receiving the instruction, the information acquisition part 342 acquires the logical volume management table 133 from the target apparatus, and stores the table 133 in the repository 33.

The program control part 341 acquires the coupling destination iSCSI target names and LUN-ID of the respective logical volumes from the logical volume management table 133. The program control part 341 also acquires the iSCSI target names and LUN-ID of the respective in-storage logical volumes 26 from the device coupling management table 334. The program control part 341 compares the iSCSI target names and LUN-ID acquired from the table 133 with the iSCSI target names and LUN-ID acquired from the table 334, and judges whether or not there is a match therebetween (S85). When there is no match (S85: NO), the processing ends, and the program control part 341 moves on to processing of the next IP address.

In cases where there is a logical volume with the same iSCSI target name and the same LUN-ID in both the logical volume management table 133 and the device coupling management table 334 (S85: YES), the processing moves to FIG. 25.

The program control part 341 judges the node type of the target apparatus to be 'server', and registers this information in the discovery management table 335 (S86). The program control part 341 attempts authentication of the target apparatus via the information acquisition part 342 (S87). The information acquisition part 342 attempts authentication of the target apparatus by using communication protocols prepared beforehand for a 'server' in order of priority (S87).

Following authentication, the program control part 341 stores the IP addresses of the target apparatus in the discovery target address management table 332 discovered apparatus management table 333 (S88). Furthermore, the program control part 341 requests that the information acquisition part 342 acquire composition information from the target apparatus (S89). After receiving the instruction, the information acquisition part 342 acquires host composition information from the target apparatus, and stores this information in the repository 33.

As illustrated in FIGS. 20 to 25, undiscovered hosts 10 can be discovered and added to the monitoring target. Furthermore, in this embodiment, after obtaining a lead on other apparatus from the apparatus that have been added to the monitoring targets, other apparatus are discovered using so-called successive discovery and added to the monitoring targets.

Figure 26:
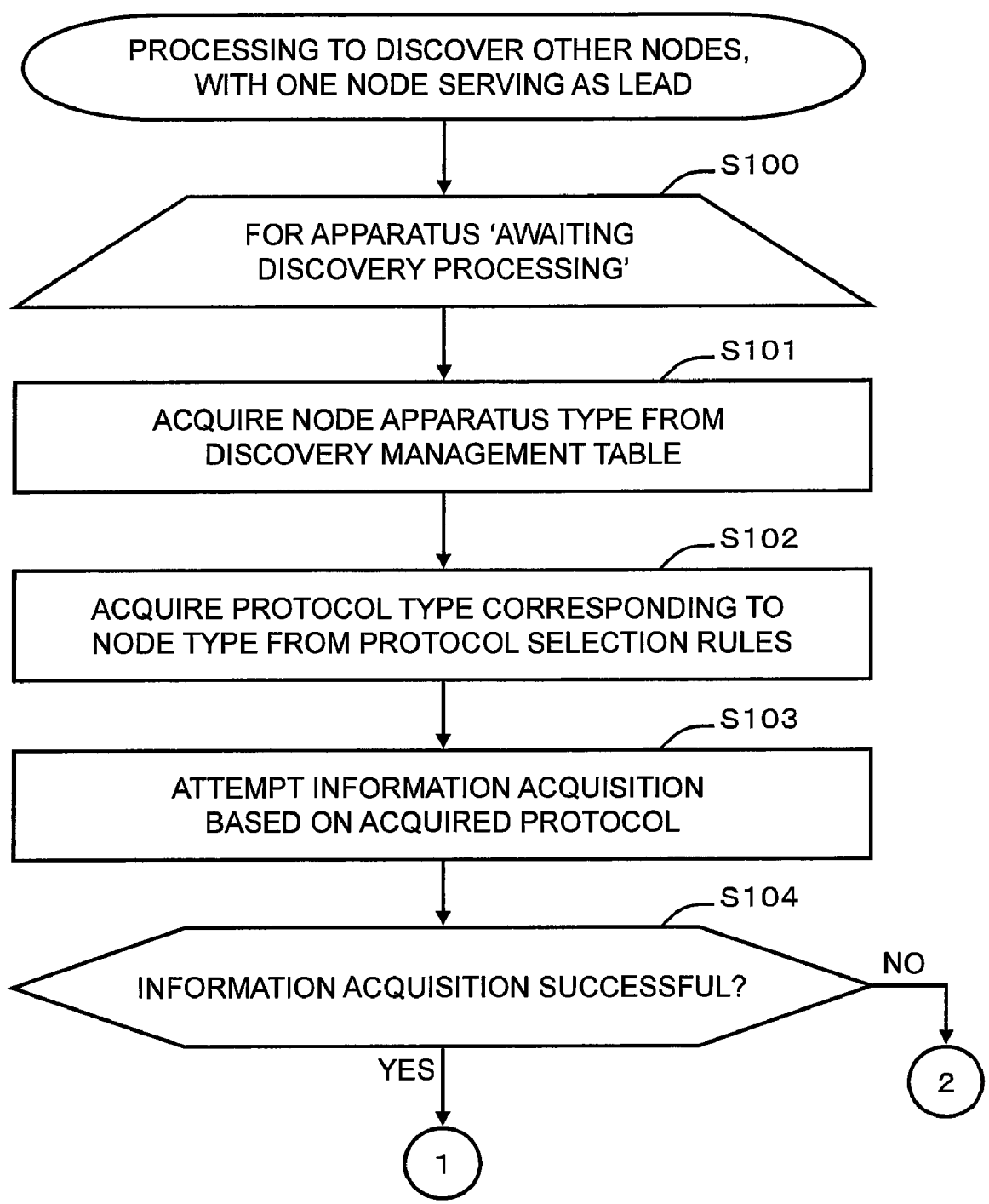
FIG. 26 is a flowchart for processing for successively discovering other nodes, with one node serving as a lead.
Figure 27:
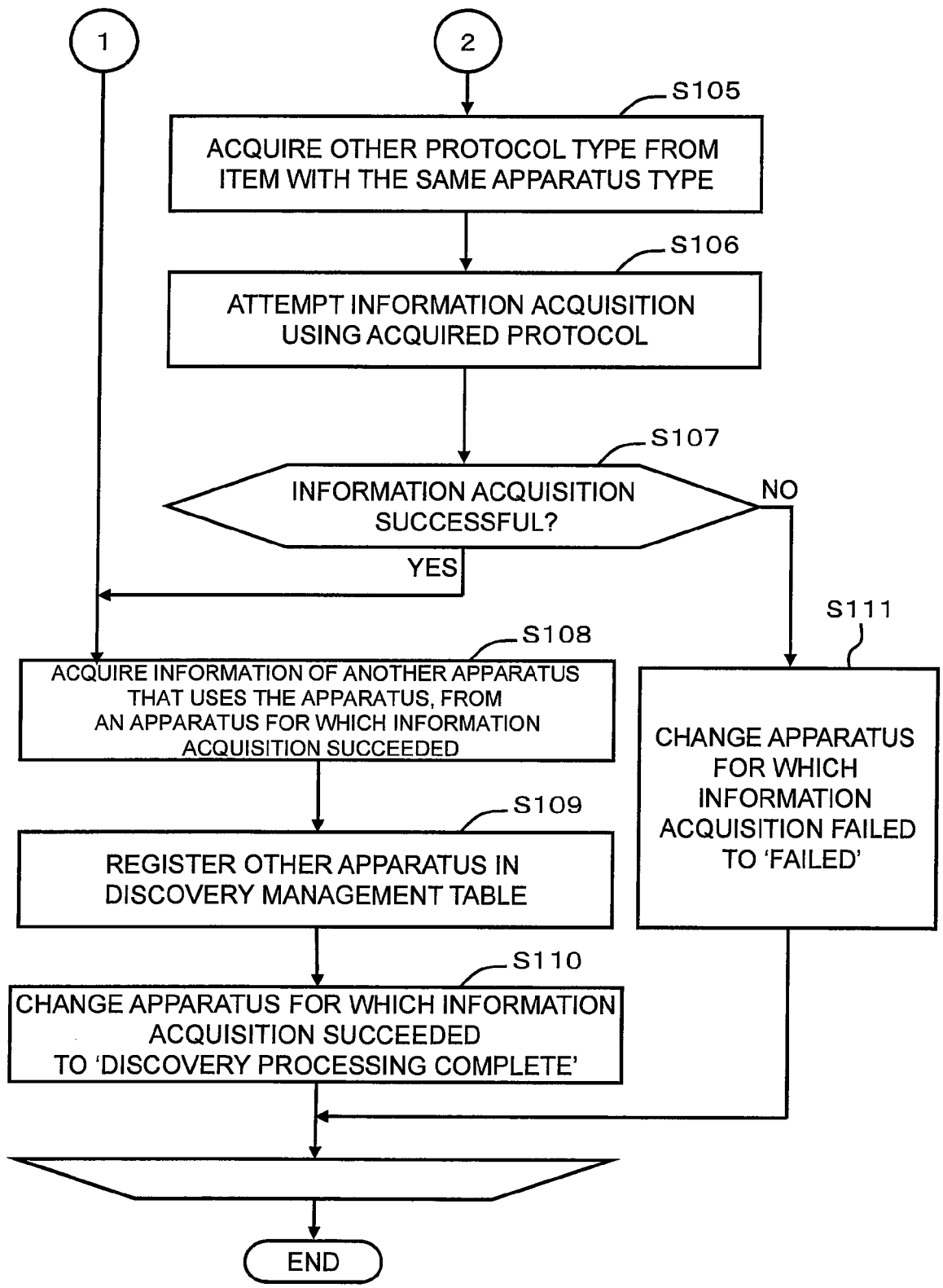
FIG. 27 is a flowchart that continues on from FIG. 26.

FIGS. 26 and 27 are flowcharts showing processing to discover other nodes, using one node as a lead. This processing is executed by the management server 30. The following description will be provided by focusing on the management server rather than the program control part 341 and the information acquisition part 342.

The management server 30 references the discovery processing flag 3353 in the discovery management table 335, and executes the following steps S101 to S110 for apparatus (target apparatus hereinbelow) with an IP address in the 'waiting (awaiting discovery processing)' state (S100).

The management server 30 acquires the node types of the target apparatus from the discovery management table 335 (S101). The management server 30 references the protocol selection rules 337, and acquires the communication protocols corresponding to the node types of the target apparatus (S102). The management server 30 attempts authentication of the target apparatus by using the acquired communication protocols (S103).

When authentication is successful (S104: YES), the management server 30 acquires information relating to other apparatus using the target apparatus, from the target apparatus, as shown in FIG. 27 (S108). For example, when the target apparatus is the storage apparatus 20, other apparatus (undiscovered apparatus) that use the storage apparatus 20 can be detected on the basis of the logical volume management table 232 or the iSCSI target management table 233 of the storage apparatus 20.

When other apparatus have been discovered, the management server 30 registers the other apparatus in the discovery management table 335 (S109). The discovery processing flags of the other apparatus are set to 'waiting (awaiting discovery processing)'. Discovery of other apparatus using the target apparatus is complete, and therefore the management server 30 changes the discovery processing flag of the target apparatus to 'complete (discovery processing complete)', and ends the processing (S110).

Further, when authentication of the target apparatus has failed (S104: NO), the management server 30 references the protocol selection rules 337, and acquires other communication protocols associated with the same apparatus types (S105). The management server 30 attempts authentication of the target apparatus by using the communication protocols acquired in S105 (S106).

A case where it has not been possible to authenticate the target apparatus even by using the respective communication protocols SMI-S and SNMP, associated with the node type 'storage', for example, will now be described. In this case (S104: NO), the management server 30 references the protocol selection rules 337, and acquires other communication protocols (protocols A1, A2, B1, C1, C2) associated with the same apparatus type 'storage' as the communication protocols with which authentication failed.

The apparatus type corresponds to the superordinate concept of the node type, and therefore, even though communication protocols may have different node types, when there is a common apparatus type, authentication is more likely to be successful than when communication protocols of different apparatus types are used. The management server 30 therefore re-attempts authentication of the target apparatus by using different communication protocols of a common apparatus type (S106).

When authentication is successful (S106: YES), the management server 30 moves on to S108. When authentication fails (S106: NO), the management server 30 changes the discovery processing flags of the target apparatus to 'failed' (S111), and ends the processing. The management server 30 then moves on to the processing of the next IP address.

A specific example of S101 to S104, and S108 to S110 will now be described with reference to FIG. 28. The management server 30 discovers the IP address (192.168.5.36), whose discovery processing flag has been set to 'waiting', from the discovery management table 335(1) (S101). The node type of the target apparatus with this IP address is 'storage'.

The management server 30 references the protocol selection rules 337 and acquires communication protocols SMI-S and SNMP, which are associated with the node type 'storage' (S102). Here, SMI-S is configured with a higher priority than SNMP. The management server 30 first attempts authentication using SMI-S, and then, when authentication fails, attempts authentication using SNMP (S103).

When authentication is successful (S104: YES), the management server 30 acquires information relating to another apparatus that uses the storage apparatus 20 from the target apparatus (the storage apparatus 20 with which authentication succeeded) (S108). The other apparatus discovered is the host 10. The IP address of the host 10 is (192.168.5.34).

Figure 28:
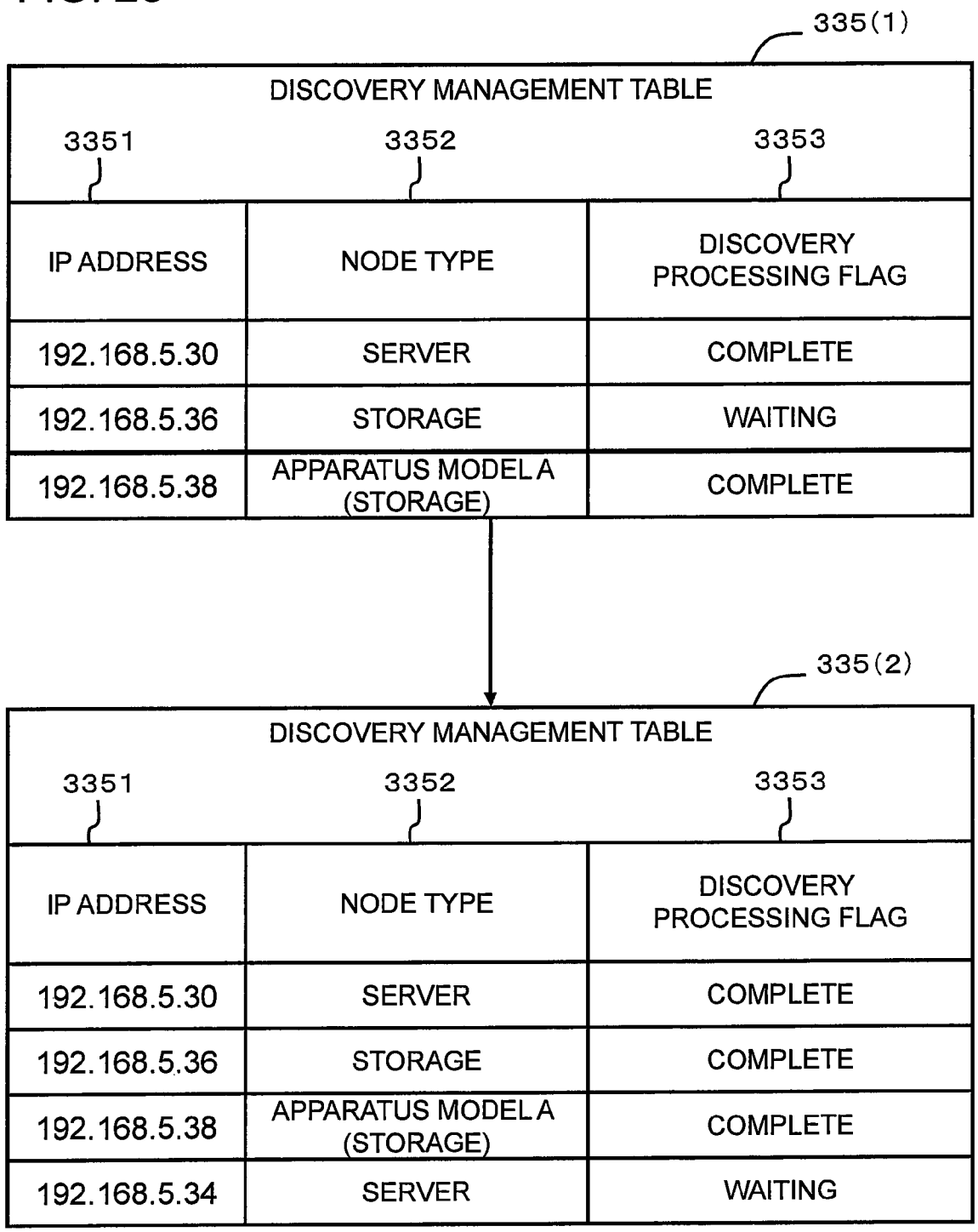
FIG. 28 shows changes to the discovery management table.

The management server 30 adds the other apparatus thus discovered (host 10) to the discovery management table 335 (2) shown in FIG. 28 (S109). The node type of the discovered other apparatus (host 10) is configured as 'server', and the discovery processing flag is set to 'waiting'.

As a result of the above processing, the search for other apparatus using the storage apparatus 20 is complete. Therefore, the management server 30 changes the discovery processing flag of the storage apparatus 20, i.e. the target apparatus (IP address: 192.168.5.36) to 'complete'.

Thereafter, the management server 30 references the discovery management table 335(2), discovers the host 10 with the IP address (192.168.5.34), whose discovery processing flag is set to 'waiting' (S100), and executes steps S101 and subsequent steps as appropriate.

This embodiment thus allows hosts 10 that are unknown to the administrator to be discovered and added to the monitoring targets. The administrator is therefore able to discover each of the nodes in an information processing system simply by configuring an IP address range in the discovery target address management table 332, whereby usability is improved.

Furthermore, according to this embodiment, the protocol selection rules 337 are created by pre-associating communication protocols that can be used by the apparatus, with each of the apparatus types. According to this embodiment, the protocol selection rules 337 are used to select communication protocols suitable for the apparatus, in order of priority, in order to attempt to communicate with these apparatus. Therefore, with this embodiment, discovery processing is executed efficiently, thereby shortening the time required to complete the processing.

Figure 29:
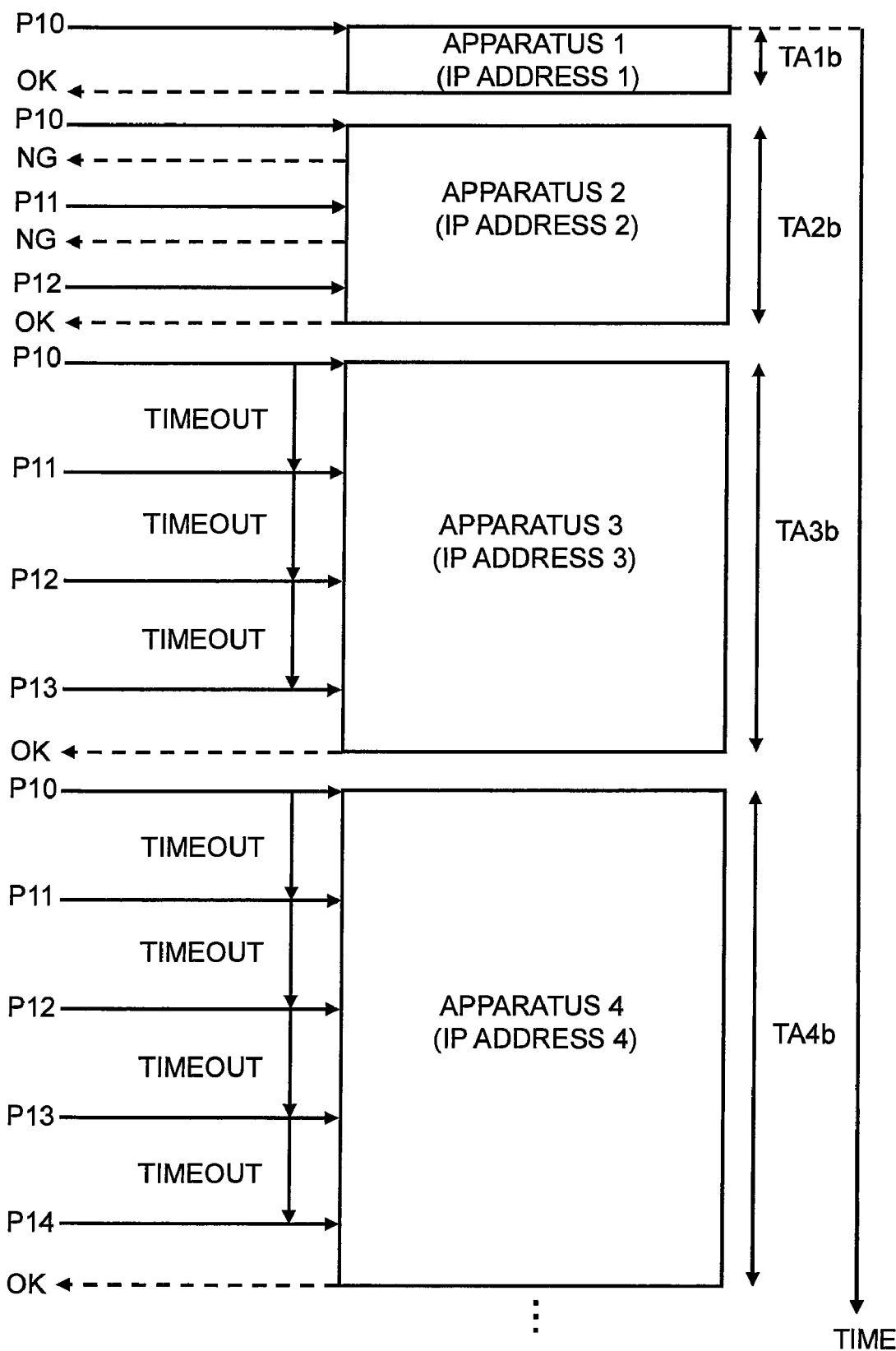
FIG. 29 provides an overview of an authentication processing operation when the present invention is not adopted.

FIG. 29 shows a reference example that is used to show the effect of this embodiment. In the reference example shown in FIG. 29, a plurality of communication protocols prepared beforehand are used in sequence, until a response is received from the apparatus, irrespective of the apparatus type. The processing method shown in FIG. 29 is executed by a different management server from the management server 30 of this embodiment.

The management server attempts access to an apparatus 1, shown at the top of FIG. 29, using a first communication protocol P10. As it happens, in cases where the apparatus 1 corresponds to the first communication protocol P10, the apparatus 1 immediately responds to the inquiry from the management server. The time taken to discover the apparatus 1 is TA1*b*.

The management server likewise attempts access to an apparatus 2 by using the first communication protocol P10. The apparatus 2 is a high-security level apparatus, and does not respond in any way to communication protocols that are incompatible with the apparatus 2. The management server therefore continues to await a response from the apparatus 2 until a preset time has elapsed.

When the first communication protocol P10 times out, the management server attempts access using a second communication protocol P11. However, the apparatus 2 does not respond to the second communication protocol P11. The management server therefore waits idly until the timeout judgment has been made.

When the second communication protocol P11 times out, the management server attempts access to the apparatus 2 by using a third communication protocol P12. The apparatus 2 is compatible with the second communication protocol P12, and therefore responds to the inquiry from the management server. The time taken to discover the apparatus 2 is TA2*b* (TA2*b*>TA1*b*).

The management server then moves to processing for an apparatus 3. The apparatus 3 is also a high-security level apparatus, and does not respond to communication protocols other than a fourth communication protocol P13. The management server therefore awaits a timeout judgment for each of the communication protocols P10 to P12, and then tests the fourth communication protocol P13. The time taken to discover the apparatus 3 is TA3*b* (TA3*b*>TA2*b*).

The management server then moves to processing of apparatus 4. The apparatus 4 responds only to a fifth communication protocol P14. The management server tests each of the communication protocols P10 to P14 in that order. The time taken to obtain a response from the apparatus 4 is TA4*b* (TA4*b*>TA3*b*).

Figure 30:
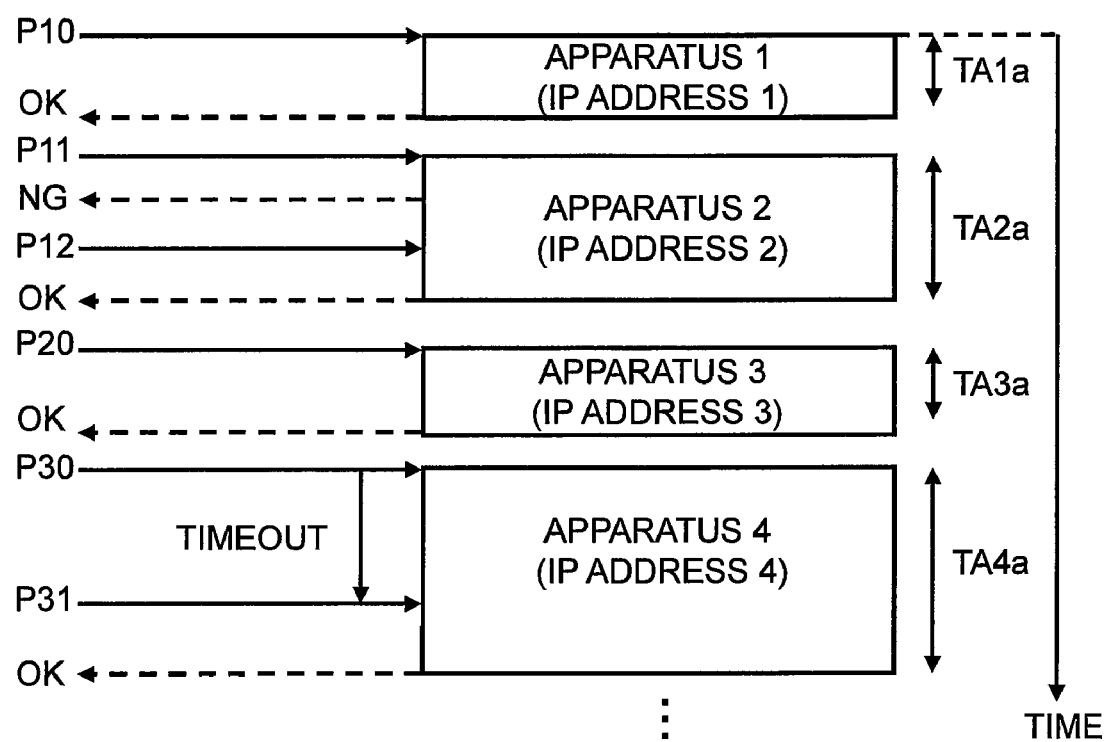
FIG. 30 provides an overview of an authentication processing operation when the present invention is adopted.

FIG. 30 shows a case according to this embodiment. As described earlier, in this embodiment, communication protocols prepared beforehand according to each of the apparatus types have usage priority over the other communication protocols. Hence, the times TA1*a*, TA2*a*, TA3*a*, and TA4*a* required for the processing of the apparatus 1 to 4 respectively can be shortened.

Furthermore, according to this embodiment, in cases where authentication fails using communication protocols that are prepared according to apparatus type, authentication is attempted using communication protocols that are associated with apparatus different from these apparatus (see S105 and S106 in FIG. 27). In other words, with this embodiment, in cases where processing fails using communication protocols prepared according to node type, other node types are detected which have a common apparatus type with the apparatus type to which the node types belong, and communication protocols that are associated with these other node types are used. Hence, the likelihood of authentication processing being successful can be improved, which raises usability. Communication protocols that are associated according to apparatus type (node type) are called first communication protocols (or a first communication protocol group), and communication protocols that are associated with other node types with a common apparatus type can be called second communication protocols (or a second communication protocol group).

Furthermore, according to this embodiment, the addresses (access information) of other apparatus related to the discovered apparatus are acquired from these apparatus. Related apparatus can therefore be discovered efficiently even when they fall outside the search range. In other words, according to this embodiment, apparatus can be discovered quickly over a broader range, whereby usability is improved.

Second Embodiment

A second embodiment will now be described with reference to FIG. 32. The following embodiments, including this embodiment, correspond to modifications of the first embodiment. The following embodiments will therefore be described with an emphasis on their differences from the first embodiment. According to this embodiment, in cases where authentication fails using communication protocols corresponding to the node type (S104: NO), and where authentication also fails using communication protocols corresponding to other node types with a common apparatus type (S107: NO), authentication is attempted by using all the communication protocols (S112).

Figure 31:
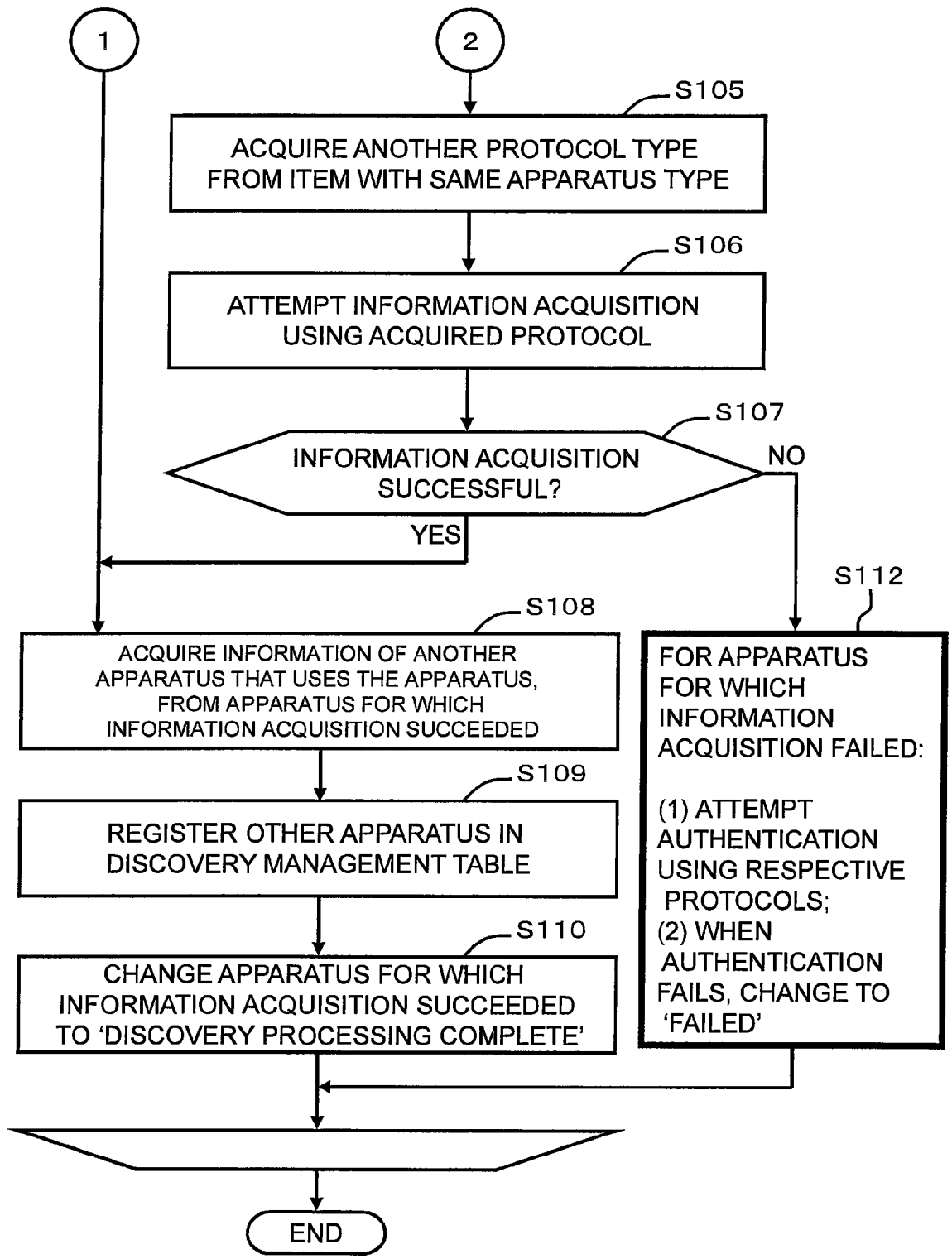
FIG. 31 is a flowchart for processing, executed by a management server according to a second embodiment, which is a substitute for the processing of FIG. 27.

FIG. 31 shows a flowchart that is executed as a substitute for the flowchart shown in FIG. 27. The management server 30 executes S112 in cases where apparatus authentication has not been possible (S107: NO) even by using communication protocols associated with other node types with a common apparatus type (S105).

In S112, the management server 30 attempts authentication of the apparatus by using all the communication protocols available to the management server 30 in sequence. In other words, the management server 30 executes authentication processing using a round-robin system, such as that shown in FIG. 29. In cases where authentication is not possible even using all the communication protocols, the management server 30 changes the discovery processing flag in the discovery management table 335 to 'failed'.

With the composition above, this embodiment also provides effects similar to those of the first embodiment. Furthermore, in this embodiment, in cases where authentication also fails using communication protocols corresponding to other node types with a common apparatus type, authentication is attempted using all the communication protocols, and therefore the likelihood of successful apparatus authentication can be improved.

Third Embodiment

Figure 32:
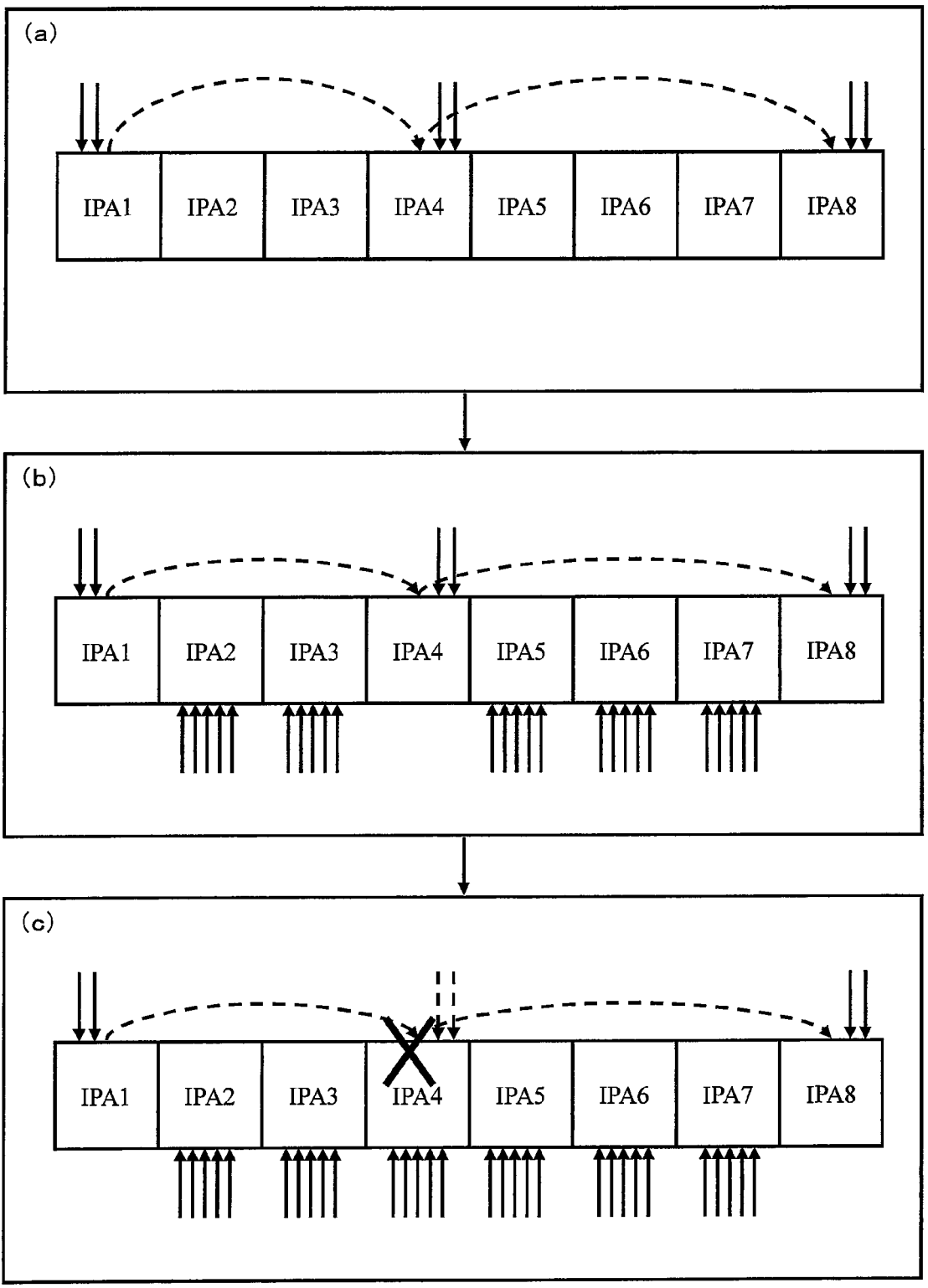
FIG. 32 shows an aspect in which two modes are operated jointly, according to a third embodiment.

FIG. 32 schematically shows operation of the management server 30 according to a third embodiment. FIG. 32A provides a simplified representation of the operation (see FIGS. 26 and 27) of high-speed discovery processing, and so-called 'successive discovery processing', described in the first embodiment.

Here, high-speed discovery processing is processing that uses, in order of priority, predetermined communication protocols prepared beforehand according to the type of each apparatus. High-speed discovery processing corresponds to a 'first discovery mode'. Successive discovery processing is processing whereby, based on information acquired from a discovered apparatus, other apparatus that use the apparatus are discovered.

FIG. 32B shows an aspect in which the 'successive discovery processing' and 'high-speed discovery processing' of the first embodiment are combined with a method in which all available communication protocols are tested ('round-robin discovery processing' hereinbelow). In this example, authentication is attempted by sequentially using all the communication protocols for the IP addresses which were not targets in the successive discovery processing (IPA2, IPA3, IPA5, IPA6, and IPA7 in FIG. 32, for example). Round-robin discovery processing corresponds to a 'second discovery mode'.

FIG. 32C is another example in which the successive discovery processing and the round-robin discovery processing are combined. That is, FIG. 32C simplifies the operation of the second embodiment. In this example, all the communication protocols are attempted for the apparatus (IPA4) that failed authentication in successive discovery processing. In other words, FIG. 32C shows the operation of the second embodiment.

The management server 30 is able to execute selectively one or a plurality of the methods shown in FIGS. 32A to 32C in response to an instruction from the administrator, or depending on the selection result of a predetermined mode selection program, for example.

With this composition, this embodiment also provides effects similar to those of the first embodiment. Moreover, according to this embodiment, a plurality of different discovery mode can be suitably combined or used individually. Usability can therefore be improved.

Note that the present invention is not limited to the above embodiments. A person skilled in the art is able to make a variety of additions or modifications and so forth within the scope of the present invention, such as suitably combining the above embodiments, for example.

The invention claimed is:

1. A management system for managing a plurality of apparatuses coupled to a communication network, comprising:
    a memory area;
    a microprocessor configured to execute predetermined processing using the memory area; and
    a communication interface with which the microprocessor is configured to communicate with each of the apparatuses via the communication network,
    wherein the microprocessor is configured to:
        acquire access information that can be used to access a monitoring target apparatus on the basis of network service utilization information relating to services used between the apparatuses via the communication network,
        judge a type of the monitoring target apparatus, and
        acquire composition information from the monitoring target apparatus on the basis of the judged type and protocol selection rules;
    wherein the plurality of apparatuses coupled to the communication network includes at least:
        a plurality of apparatuses having a storage area; and
        a plurality of apparatuses configured to use the storage area,
    wherein the memory area is configured to store at least:
        monitoring target address management information for pre-storing the IP address of the monitoring target apparatus;
        device coupling management information created by associating a referencing/referenced relationship of public names of apparatus associated with the storage area with apparatus names corresponding to the public names; and
        communication protocol selection information configured to store type judgment information for judging the type of the monitoring target apparatus, and communication protocols corresponding to the judged apparatus type, and
    wherein, in a case where the communication network includes a name management apparatus configured to manage, for the respective apparatuses, a public name and an address of the apparatus, and a type of a public name that represents a name assigned to a referenced apparatus or a name assigned to a referencing apparatus, the microprocessor is configured to:
        (1a) detect a predetermined storage area with which the apparatus name is not associated by using the device coupling management information;
        (1b) in cases where a reference source of public name referencing has been configured in the predetermined storage area, acquire an address corresponding to the reference source from the name management information;
        (1c) in cases where the address corresponding to the reference source is registered in the monitoring target address management information, judge the apparatus referencing the predetermined storage area to be a reference source apparatus and register this apparatus in the type judgment information;
        (1d) acquire a communication protocol prepared beforehand for the apparatus from the communication protocol selection information and use the communication protocol to execute authentication of the predetermined apparatus;
        (1e) in cases where the reference source has not been configured in the predetermined storage area, issue a request to all addresses defined in the name management information to send apparatus composition information indicating a composition of the reference source apparatus;
        (1f) judge an apparatus that sends reference source apparatus composition information in response to the request to be a reference source apparatus and register the apparatus in the type judgment information; and
        (1g) use the reference source apparatus communication protocol to execute authentication of the apparatus that sent the reference source apparatus composition information,
    wherein, in cases where the name management apparatus is not included in the communication network, the microprocessor is configured to:
        (2a) issue a request to all addresses included in the monitoring target address management information to send composition information of the reference source apparatus;
        (2b) judge an apparatus that sends the apparatus composition information in response to the request to be the reference source apparatus and register the apparatus in the type judgment information; and
        (2c) use the reference source apparatus communication protocol to execute authentication of the apparatus that sent the apparatus composition information,
    wherein the microprocessor is configured to:
        acquire, by authenticating a registered apparatus registered in the type judgment information, configuration information relating to another apparatus which uses the registered apparatus, from the registered apparatus;
        judge the type of the other apparatus on the basis of the configuration information and register the type in the type judgment information; and acquire a communication protocol prepared beforehand according to the type of the other apparatus from the communication protocol selection information and use the communication protocol to execute authentication of the other apparatus; and wherein, when executing each authentication, in cases where authentication fails in the use of the communication protocol acquired from the communication protocol selection information, the microprocessor is configured to re-attempt the authentication by using another communication protocol prepared beforehand for another apparatus type that belongs to the same group as the communication protocol.

2. A management system according to claim 1, wherein, in cases where authentication of the monitoring target apparatus fails, the microprocessor is configured to re-attempt authentication of the monitoring target apparatus on the basis of another type that is pre-associated with the judged type.

3. A management system according to claim 2, wherein, after authenticating the monitoring target apparatus, the microprocessor is configured to acquire configuration information relating to another apparatus that uses the monitoring target apparatus from the monitoring target apparatus, and to authenticate the other apparatus on the basis of the type of the other apparatus.

4. A management system according to claim 2,
wherein the microprocessor is configured to execute a first discovery mode and a second discovery mode,
wherein the first discovery mode is configured such that the monitoring target apparatus is authenticated on the basis of the judged type, and
wherein the second discovery mode is configured such that the monitoring target apparatus is authenticated by sequentially testing a plurality of communication protocols prepared beforehand.

5. A management system according to claim 2, wherein the network service utilization information is supplied by an iSNS server coupled to the communication network.

6. A non-transitory computer-readable recording medium recorded with a computer program causing a computer to function as a management apparatus configured to manage a plurality of apparatuses coupled to a communication network,
wherein the computer program causes, when executed, the computer to:
acquire access information that can be used to access a monitoring target apparatus on the basis of network service utilization information relating to services used between the respective apparatuses via the communication network;
judge the type of the monitoring target apparatus; and
authenticate the monitoring target apparatus on the basis of the judged type;
wherein the management apparatus includes:
a memory area;
a microprocessor configured to execute predetermined processing using the memory area; and
a communication interface with which the microprocessor is configured to communicate with each of the apparatuses via the communication network;
wherein the plurality of apparatuses coupled to the communication network includes at least:
a plurality of apparatuses having a storage area; and
a plurality of apparatuses configured to use the storage area,
wherein the memory area is configured to store at least:

monitoring target address management information for pre-storing the IP address of the monitoring target apparatus;
device coupling management information created by associating a referencing/referenced relationship of public names of apparatus associated with the storage area with apparatus names corresponding to the public names; and
communication protocol selection information configured to store type judgment information for judging the type of the monitoring target apparatus, and communication protocols corresponding to the judged apparatus type, and
wherein, in a case where the communication network includes a name management apparatus configured to manage, for the respective apparatuses, a public name and an address of the apparatus, and a type of a public name that represents a name assigned to a referenced apparatus or a name assigned to a referencing apparatus, the microprocessor is configured by the computer program to:
(1a) detect a predetermined storage area with which the apparatus name is not associated by using the device coupling management information;
(1b) in cases where a reference source of public name referencing has been configured in the predetermined storage area, acquire an address corresponding to the reference source from the name management information;
(1c) in cases where the address corresponding to the reference source is registered in the monitoring target address management information, judge the apparatus referencing the predetermined storage area to be a reference source apparatus and register this apparatus in the type judgment information;
(1d) acquire a communication protocol prepared beforehand for the apparatus from the communication protocol selection information and use the communication protocol to execute authentication of the predetermined apparatus;
(1e) in cases where the reference source has not been configured in the predetermined storage area, issue a request to all addresses defined in the name management information to send apparatus composition information indicating a composition of the reference source apparatus;
(1f) judge an apparatus that sends reference source apparatus composition information in response to the request to be a reference source apparatus and register the apparatus in the type judgment information; and
(1g) use the reference source apparatus communication protocol to execute authentication of the apparatus that sent the reference source apparatus composition information,
wherein, in cases where the name management apparatus computer not included in the communication network, the microprocessor is configured by the computer program to:
(2a) issue a request to all addresses included in the monitoring target address management information to send composition information of the reference source apparatus;
(2b) judge an apparatus that sends the apparatus composition information in response to the request to be the reference source apparatus and register the apparatus in the type judgment information; and (2c) use the reference source apparatus communication protocol to execute authentication of the apparatus that sent the apparatus composition information, wherein the microprocessor is configured by the computer program to:

acquire, by authenticating a registered apparatus registered in the type judgment information, configuration information relating to another apparatus which uses the registered apparatus, from the registered apparatus;

judge the type of the other apparatus on the basis of the configuration information and register the type in the type judgment information; and acquire a communication protocol prepared beforehand according to the type of the other apparatus from the communication protocol selection information and use the communication protocol to execute authentication of the other apparatus; and wherein, when executing each authentication, in cases where authentication fails in the use of the communication protocol acquired from the communication protocol selection information, the microprocessor is configured by the computer program to re-attempt the authentication by using another communication protocol prepared beforehand for another apparatus type that belongs to the same group as the communication protocol.

7. The non-transitory computer-readable recording medium according to claim 6, wherein a computer program recorded on the medium causes the computer, in cases where the computer fails to authenticate the monitoring target apparatus, to re-attempt authentication of the monitoring target apparatus on the basis of another type that is pre-associated with the judged type.

8. The non-transitory computer-readable recording medium according to claim 6, wherein a computer program recorded on the medium causes the computer, after the monitoring target apparatus is authenticated, to acquire configuration information relating to another apparatus that uses the monitoring target apparatus from the monitoring target apparatus, and to authenticate the other apparatus on the basis of the type of the other apparatus.

9. The non-transitory computer-readable recording medium according to claim 6, which is recorded with a computer program causing the computer to execute a first discovery mode and a second discovery mode, wherein the first discovery mode is configured such that the monitoring target apparatus is authenticated on the basis of the judged type, and wherein the second discovery mode is configured such that the monitoring target apparatus is authenticated by sequentially testing a plurality of communication protocols prepared beforehand.

10. The non-transitory computer-readable recording medium according to claim 6, wherein the network service utilization information is supplied by an iSNS server coupled to the communication network.

11. A program distribution apparatus for distributing a management computer program that is executed by a management apparatus for managing a plurality of apparatuses coupled to a communication network, wherein the management apparatus includes:

a memory area;

a microprocessor executing predetermined processing by using the memory area; and a communication interface with which the microprocessor communicates with each of the apparatuses via the communication network, and the management computer program causes the microprocessor to:

acquire access information that can be used to access a monitoring target apparatus on the basis of network service utilization information relating to services used between the apparatuses via the communication network;

judge a type of the monitoring target apparatus; and authenticate the monitoring target apparatus on the basis of the judged type;

wherein the plurality of apparatuses coupled to the communication network includes at least:

a plurality of apparatuses having a storage area; and a plurality of apparatuses configured to use the storage area, wherein the memory area is configured to store at least:

monitoring target address management information for pre-storing the IP address of the monitoring target apparatus;

device coupling management information created by associating a referencing/referenced relationship of public names of apparatus associated with the storage area with apparatus names corresponding to the public names; and communication protocol selection information configured to store type judgment information for judging the type of the monitoring target apparatus, and communication protocols corresponding to the judged apparatus type, and wherein, in a case where the communication network includes a name management apparatus configured to manage, for the respective apparatuses, a public name and an address of the apparatus, and a type of a public name that represents a name assigned to a referenced apparatus or a name assigned to a referencing apparatus, the microprocessor is configured to:

(1a) detect a predetermined storage area with which the apparatus name is not associated by using the device coupling management information;

(1b) in cases where a reference source of public name referencing has been configured in the predetermined storage area, acquire an address corresponding to the reference source from the name management information;

(1c) in cases where the address corresponding to the reference source is registered in the monitoring target address management information, judge the apparatus referencing the predetermined storage area to be a reference source apparatus and register this apparatus in the type judgment information;

(1d) acquire a communication protocol prepared beforehand for the apparatus from the communication protocol selection information and use the communication protocol to execute authentication of the predetermined apparatus;

(1e) in cases where the reference source has not been configured in the predetermined storage area, issue a request to all addresses defined in the name management information to send apparatus composition information indicating a composition of the reference source apparatus;

(1f) judge an apparatus that sends reference source apparatus composition information in response to the request to be a reference source apparatus and register the apparatus in the type judgment information; and (1g) use the reference source apparatus communication protocol to execute authentication of the apparatus that sent the reference source apparatus composition information, wherein, in cases where the name management apparatus is not included in the communication network, the microprocessor is configured to:

(2a) issue a request to all addresses included in the monitoring target address management information to send composition information of the reference source apparatus;

(2b) judge an apparatus that sends the apparatus composition information in response to the request to be the reference source apparatus and register the apparatus in the type judgment information; and (2c) use the reference source apparatus communication protocol to execute authentication of the apparatus that sent the apparatus composition information, wherein the microprocessor is configured to:

acquire, by authenticating a registered apparatus registered in the type judgment information, configuration information relating to another apparatus which uses the registered apparatus, from the registered apparatus;

judge the type of the other apparatus on the basis of the configuration information and register the type in the type judgment information; and acquire a communication protocol prepared beforehand according to the type of the other apparatus from the communication protocol selection information and use the communication protocol to execute authentication of the other apparatus; and wherein, when executing each authentication, in cases where authentication fails in the use of the communication protocol acquired from the communication protocol selection information, the microprocessor is configured to re-attempt the authentication by using another communication protocol prepared beforehand for another apparatus type that belongs to the same group as the communication protocol.

12. The program distribution apparatus according to claim 11, wherein, in cases where the microprocessor fails to authenticate the monitoring target apparatus, the microprocessor is configured to re-attempt authentication of the monitoring target apparatus on the basis of another type that is pre-associated with the judged type.

13. The program distribution apparatus according to claim 11, wherein, after the monitoring target apparatus is authenticated, the microprocessor is configured to acquire configuration information relating to another apparatus that uses the monitoring target apparatus from the monitoring target apparatus, and to authenticate the other apparatus on the basis of the type of the other apparatus.

14. The program distribution apparatus according to claim 11, which is configured to distribute a computer program that causes the microprocessor to execute a first discovery mode and a second discovery mode, wherein the first discovery mode is configured such that the monitoring target apparatus is authenticated on the basis of the judged type, and wherein the second discovery mode is configured such that the monitoring target apparatus is authenticated by sequentially testing a plurality of communication protocols prepared beforehand.

* * * * *